(12) United States Patent
Atur et al.

(10) Patent No.: US 11,743,188 B2
(45) Date of Patent: Aug. 29, 2023

(54) CHECK-IN MONITORING FOR WORKFLOWS

(71) Applicant: Robin Systems, Inc., San Jose, CA (US)

(72) Inventors: Sree Nandan Atur, Newark, CA (US); Pragash Vijayaragavan, San Jose, CA (US); Lakshay Badlani, Hayward, CA (US); Projit Bandyopadhyay, Fremont, CA (US); Stéphanie Morel, East Palo Alto, CA (US)

(73) Assignee: Robin Systems, Inc., San Jose, CA (US)

( * ) Notice: Subject to any disclaimer, the term of this patent is extended or adjusted under 35 U.S.C. 154(b) by 137 days.

(21) Appl. No.: 17/061,500

(22) Filed: Oct. 1, 2020

(65) Prior Publication Data

US 2022/0109630 A1     Apr. 7, 2022

(51) Int. Cl.
  *H04L 47/125*     (2022.01)
  *H04L 47/2483*    (2022.01)
  *H04L 47/2441*    (2022.01)

(52) U.S. Cl.
  CPC ........ *H04L 47/125* (2013.01); *H04L 47/2441* (2013.01); *H04L 47/2483* (2013.01)

(58) Field of Classification Search
  None
  See application file for complete search history.

(56) References Cited

U.S. PATENT DOCUMENTS

| | | | |
|---|---|---|---|
| 3,715,573 A | 2/1973 | Vogelsberg | |
| 4,310,883 A | 1/1982 | Clifton | |
| 5,602,993 A | 2/1997 | Stromberg | |
| 5,680,513 A | 10/1997 | Hyland | |
| 5,796,290 A | 8/1998 | Takahashi | |
| 6,014,669 A | 1/2000 | Slaughter | |
| 6,052,797 A | 4/2000 | Ofek | |

(Continued)

FOREIGN PATENT DOCUMENTS

| JP | 2008305433 | 12/2008 |
|---|---|---|
| WO | WO2017008675 | 1/2017 |

OTHER PUBLICATIONS

Segment map, Google, Feb. 4, 2019.

(Continued)

*Primary Examiner* — Anh Ngoc M Nguyen

(74) *Attorney, Agent, or Firm* — David R. Stevens; Stevens Law Group

(57) ABSTRACT

A workflow may include function calls to functions executed with respect to instances of elements. Functions may be stored in a file store. When functions are edited and checked in to the file store, change to the function may be detected and workflows implicated by the change to the function are identified. Execution of the implicated workflows may then be invoked in response to detecting the change. Functions may have an exclusivity associated with them such that execution of a workflow includes executing function calls alone where required by the exclusivity or concurrently where permitted by the exclusivity. Check-in monitoring on a repository of element files (element definition and element functions) may be performed. In response to check-in of a file, workflows including elements referencing the file may be executed.

20 Claims, 22 Drawing Sheets

(56) References Cited

U.S. PATENT DOCUMENTS

| | | |
|---|---|---|
| 6,119,214 A | 9/2000 | Dirks |
| 6,157,963 A | 12/2000 | Courtright, II |
| 6,161,191 A | 12/2000 | Slaughter |
| 6,298,478 B1 | 10/2001 | Nally |
| 6,301,707 B1 | 10/2001 | Carroll |
| 6,311,193 B1 | 10/2001 | Sekido |
| 6,851,034 B2 | 2/2005 | Challenger |
| 6,886,160 B1 | 4/2005 | Lee |
| 6,895,485 B1 | 5/2005 | Dekoning |
| 6,957,221 B1 | 10/2005 | Hart |
| 7,096,465 B1 | 8/2006 | Dardinski |
| 7,111,055 B2 | 9/2006 | Falkner |
| 7,171,659 B2 | 1/2007 | Becker |
| 7,246,351 B2 | 7/2007 | Bloch |
| 7,305,671 B2 | 12/2007 | Davidov |
| 7,386,752 B1 | 6/2008 | Rakic |
| 7,461,374 B1 | 12/2008 | Balint |
| 7,467,268 B2 | 12/2008 | Lindemann |
| 7,535,854 B2 | 5/2009 | Luo |
| 7,590,620 B1 | 9/2009 | Pike |
| 7,698,698 B2 | 4/2010 | Skan |
| 7,721,283 B2 | 5/2010 | Kovachka |
| 7,734,859 B2 | 6/2010 | Daniel |
| 7,738,457 B2 | 6/2010 | Nordmark |
| 7,779,091 B2 | 8/2010 | Wilkinson |
| 7,797,693 B1 | 9/2010 | Gustafson |
| 7,984,485 B1 | 7/2011 | Rao |
| 8,037,471 B2 | 10/2011 | Keller |
| 8,046,450 B1 | 10/2011 | Schloss |
| 8,060,522 B2 | 11/2011 | Birdwell |
| 8,121,874 B2 | 2/2012 | Guheen |
| 8,171,141 B1 | 5/2012 | Offer |
| 8,219,821 B2 | 7/2012 | Zimmels |
| 8,250,033 B1 | 8/2012 | De Souter |
| 8,261,295 B1 | 9/2012 | Risbood |
| 8,326,883 B2 | 12/2012 | Pizzorni |
| 8,392,498 B2 | 3/2013 | Berg |
| 8,429,346 B1 | 4/2013 | Chen |
| 8,464,241 B2 | 6/2013 | Hayton |
| 8,505,003 B2 | 8/2013 | Bowen |
| 8,527,544 B1 | 9/2013 | Colgrove |
| 8,589,447 B1 | 11/2013 | Grunwald et al. |
| 8,601,467 B2 | 12/2013 | Hofhansl |
| 8,620,973 B1 | 12/2013 | Veeraswamy |
| 8,666,933 B2 | 3/2014 | Pizzorni |
| 8,745,003 B1 | 6/2014 | Patterson |
| 8,775,751 B1 | 7/2014 | Pendharkar |
| 8,782,632 B1 | 7/2014 | Chigurapati |
| 8,788,634 B2 | 7/2014 | Krig |
| 8,832,324 B1 | 9/2014 | Hodges |
| 8,886,806 B2 | 11/2014 | Tung |
| 8,909,885 B2 | 12/2014 | Corbett |
| 8,954,383 B1 | 2/2015 | Vempati |
| 8,954,568 B2 | 2/2015 | Krishnan |
| 8,966,198 B1 | 2/2015 | Harris |
| 9,009,542 B1 | 4/2015 | Marr |
| 9,134,992 B2 | 9/2015 | Wong |
| 9,146,769 B1 | 9/2015 | Shankar |
| 9,148,465 B2 | 9/2015 | Gambardella |
| 9,152,337 B2 | 10/2015 | Kono |
| 9,167,028 B1 | 10/2015 | Bansal |
| 9,280,591 B1 | 3/2016 | Kharatishvili |
| 9,330,155 B1 | 5/2016 | Bono |
| 9,336,060 B2 | 5/2016 | Nori |
| 9,342,444 B2 | 5/2016 | Minckler |
| 9,367,301 B1 | 6/2016 | Serrano |
| 9,390,128 B1 | 7/2016 | Seetala |
| 9,436,693 B1 | 9/2016 | Lockhart |
| 9,514,160 B2 | 12/2016 | Song |
| 9,521,198 B1 | 12/2016 | Agarwala |
| 9,569,274 B2 | 2/2017 | Tarta |
| 9,569,480 B2 | 2/2017 | Provencher |
| 9,590,872 B1 | 3/2017 | Jagtap |
| 9,600,193 B2 | 3/2017 | Ahrens |
| 9,613,119 B1 | 4/2017 | Aron |
| 9,619,389 B1 | 4/2017 | Roug |
| 9,635,132 B1 | 4/2017 | Lin |
| 9,667,470 B2 | 5/2017 | Prathipati |
| 9,733,992 B1 | 8/2017 | Poeluev |
| 9,747,096 B2 | 8/2017 | Searle |
| 9,870,366 B1 | 1/2018 | Duan |
| 9,880,933 B1 | 1/2018 | Gupta |
| 9,892,265 B1 | 2/2018 | Tripathy |
| 9,898,471 B1* | 2/2018 | Liu .............. G06F 3/1275 |
| 9,929,916 B1 | 3/2018 | Subramanian |
| 9,998,955 B1 | 6/2018 | MacCarthaigh |
| 10,019,459 B1 | 7/2018 | Agarwala |
| 10,042,628 B2 | 8/2018 | Thompson |
| 10,061,520 B1 | 8/2018 | Zhao |
| 10,133,619 B1 | 11/2018 | Nagpal |
| 10,169,169 B1 | 1/2019 | Shaikh |
| 10,191,778 B1 | 1/2019 | Yang |
| 10,241,774 B2 | 3/2019 | Spivak |
| 10,248,336 B1 | 4/2019 | Koujalagi |
| 10,282,229 B2 | 5/2019 | Wagner |
| 10,339,112 B1 | 7/2019 | Ranade |
| 10,346,001 B2 | 7/2019 | Greenberg |
| 10,353,634 B1 | 7/2019 | Greenwood |
| 10,430,434 B2 | 10/2019 | Sun |
| 10,496,653 B1* | 12/2019 | Epshteyn ......... G06F 16/24578 |
| 10,564,850 B1 | 2/2020 | Gud |
| 10,657,119 B1 | 5/2020 | Acheson |
| 10,705,878 B2 | 7/2020 | Liu |
| 10,922,303 B1 | 2/2021 | Bruck |
| 10,956,246 B1 | 3/2021 | Bagde |
| 11,082,333 B1 | 8/2021 | Lam |
| 11,093,387 B1 | 8/2021 | Chinthekindi |
| 2002/0141390 A1 | 10/2002 | Fangman |
| 2003/0126426 A1 | 7/2003 | Frye |
| 2004/0010716 A1 | 1/2004 | Childress |
| 2004/0153703 A1 | 8/2004 | Vigue |
| 2004/0221125 A1 | 11/2004 | Ananthanarayanan |
| 2005/0065986 A1 | 3/2005 | Bixby |
| 2005/0216895 A1 | 9/2005 | Tran |
| 2005/0256948 A1 | 11/2005 | Hu |
| 2006/0025908 A1 | 2/2006 | Rachlin |
| 2006/0053357 A1 | 3/2006 | Rajski |
| 2006/0080157 A1 | 4/2006 | Shuker |
| 2006/0085674 A1 | 4/2006 | Ananthamurthy |
| 2006/0259686 A1 | 11/2006 | Sonobe |
| 2007/0006015 A1 | 1/2007 | Rao |
| 2007/0016786 A1 | 1/2007 | Waltermann |
| 2007/0033356 A1 | 2/2007 | Erlikhman |
| 2007/0067583 A1 | 3/2007 | Zohar |
| 2007/0165625 A1 | 7/2007 | Eisner |
| 2007/0169113 A1 | 7/2007 | Moore |
| 2007/0260842 A1 | 11/2007 | Faibish |
| 2007/0277056 A1 | 11/2007 | Varadarajan |
| 2007/0288791 A1 | 12/2007 | Allen |
| 2008/0010421 A1 | 1/2008 | Chen |
| 2008/0068899 A1 | 3/2008 | Ogihara |
| 2008/0083012 A1 | 4/2008 | Yu |
| 2008/0189468 A1 | 8/2008 | Schmidt |
| 2008/0235544 A1 | 9/2008 | Lai |
| 2008/0256141 A1 | 10/2008 | Wayda |
| 2008/0256143 A1 | 10/2008 | Reddy |
| 2008/0256167 A1 | 10/2008 | Branson |
| 2008/0263400 A1 | 10/2008 | Waters |
| 2008/0270592 A1 | 10/2008 | Choudhary |
| 2009/0144497 A1 | 6/2009 | Withers |
| 2009/0172335 A1 | 7/2009 | Kulkarni |
| 2009/0240809 A1 | 9/2009 | La Frese |
| 2009/0254701 A1 | 10/2009 | Kurokawa |
| 2009/0307249 A1 | 12/2009 | Koifman |
| 2010/0100251 A1 | 4/2010 | Chao |
| 2010/0161941 A1 | 6/2010 | Vyshetsky |
| 2010/0162233 A1 | 6/2010 | Ku |
| 2010/0211815 A1 | 8/2010 | Mankovskii |
| 2010/0274984 A1 | 10/2010 | Inomata |
| 2010/0299309 A1 | 11/2010 | Maki |
| 2010/0306495 A1 | 12/2010 | Kumano |
| 2010/0332730 A1 | 12/2010 | Royer |
| 2011/0083126 A1 | 4/2011 | Bhakta |
| 2011/0119664 A1 | 5/2011 | Kimura |

(56) References Cited

U.S. PATENT DOCUMENTS

| | | |
|---|---|---|
| 2011/0161291 A1 | 6/2011 | Taleck |
| 2011/0188506 A1 | 8/2011 | Arribas |
| 2011/0208928 A1 | 8/2011 | Chandra |
| 2011/0239227 A1 | 9/2011 | Schaefer |
| 2011/0246420 A1 | 10/2011 | Wang |
| 2011/0276951 A1 | 11/2011 | Jain |
| 2012/0005557 A1 | 1/2012 | Mardiks |
| 2012/0016845 A1 | 1/2012 | Bates |
| 2012/0066449 A1 | 3/2012 | Colgrove |
| 2012/0102369 A1 | 4/2012 | Hiltunen |
| 2012/0137059 A1 | 5/2012 | Yang |
| 2012/0159519 A1 | 6/2012 | Matsuda |
| 2012/0216052 A1 | 8/2012 | Dunn |
| 2012/0226667 A1 | 9/2012 | Volvovski |
| 2012/0240012 A1 | 9/2012 | Weathers |
| 2012/0259819 A1 | 10/2012 | Patwardhan |
| 2012/0265976 A1 | 10/2012 | Spiers |
| 2012/0303348 A1 | 11/2012 | Lu |
| 2012/0311671 A1 | 12/2012 | Wood |
| 2012/0331113 A1 | 12/2012 | Jain |
| 2013/0054552 A1 | 2/2013 | Hawkins |
| 2013/0054932 A1 | 2/2013 | Acharya |
| 2013/0080723 A1 | 3/2013 | Sawa |
| 2013/0179208 A1 | 7/2013 | Chung |
| 2013/0254521 A1 | 9/2013 | Bealkowski |
| 2013/0282662 A1 | 10/2013 | Kumarasamy |
| 2013/0311559 A1 | 11/2013 | Swinson |
| 2013/0332688 A1 | 12/2013 | Corbett |
| 2013/0339659 A1 | 12/2013 | Bybell |
| 2013/0346618 A1 | 12/2013 | Holkkola |
| 2013/0346709 A1 | 12/2013 | Wang |
| 2014/0006465 A1 | 1/2014 | Davis |
| 2014/0047263 A1 | 2/2014 | Coatney |
| 2014/0047341 A1 | 2/2014 | Breternitz |
| 2014/0047342 A1 | 2/2014 | Breternitz |
| 2014/0058871 A1 | 2/2014 | Marr |
| 2014/0059527 A1 | 2/2014 | Gagliardi |
| 2014/0059528 A1 | 2/2014 | Gagliardi |
| 2014/0089265 A1 | 3/2014 | Talagala |
| 2014/0108483 A1 | 4/2014 | Tarta |
| 2014/0130040 A1 | 5/2014 | Lemanski |
| 2014/0149696 A1 | 5/2014 | Frenkel |
| 2014/0181676 A1 | 6/2014 | Samborskyy |
| 2014/0195847 A1 | 7/2014 | Webman |
| 2014/0245319 A1 | 8/2014 | Fellows |
| 2014/0281449 A1 | 9/2014 | Christopher |
| 2014/0282596 A1 | 9/2014 | Bourbonnais |
| 2015/0007171 A1 | 1/2015 | Blake |
| 2015/0019495 A1 | 1/2015 | Siden |
| 2015/0046644 A1 | 2/2015 | Karp |
| 2015/0067031 A1 | 3/2015 | Acharya |
| 2015/0074358 A1 | 3/2015 | Flinsbaugh |
| 2015/0106549 A1 | 4/2015 | Brown |
| 2015/0112951 A1 | 4/2015 | Narayanamurthy et al. |
| 2015/0134857 A1 | 5/2015 | Hahn |
| 2015/0149605 A1 | 5/2015 | De La Iglesia |
| 2015/0186217 A1 | 7/2015 | Eslami |
| 2015/0278333 A1 | 10/2015 | Hirose |
| 2015/0317169 A1 | 11/2015 | Sinha |
| 2015/0317212 A1 | 11/2015 | Lee |
| 2015/0319160 A1 | 11/2015 | Ferguson |
| 2015/0326481 A1 | 11/2015 | Rector |
| 2015/0378758 A1 | 12/2015 | Duggan |
| 2015/0379287 A1 | 12/2015 | Mathur |
| 2016/0011816 A1 | 1/2016 | Aizman |
| 2016/0026667 A1 | 1/2016 | Mukherjee |
| 2016/0042005 A1 | 2/2016 | Liu |
| 2016/0124775 A1 | 5/2016 | Ashtiani |
| 2016/0150047 A1 | 5/2016 | O'Hare |
| 2016/0191308 A1 | 6/2016 | Berry |
| 2016/0197995 A1 | 7/2016 | Lu |
| 2016/0239412 A1 | 8/2016 | Wada |
| 2016/0259597 A1 | 9/2016 | Worley |
| 2016/0283261 A1 | 9/2016 | Nakatsu |
| 2016/0357456 A1 | 12/2016 | Iwasaki |
| 2016/0357548 A1 | 12/2016 | Stanton |
| 2016/0373327 A1 | 12/2016 | Degioanni |
| 2017/0034023 A1 | 2/2017 | Nickolov |
| 2017/0060710 A1 | 3/2017 | Ramani |
| 2017/0060975 A1 | 3/2017 | Akyureklier |
| 2017/0075749 A1 | 3/2017 | Ambichl |
| 2017/0139645 A1 | 5/2017 | Byun |
| 2017/0149843 A1 | 5/2017 | Amulothu |
| 2017/0168903 A1 | 6/2017 | Dornemann |
| 2017/0171097 A1 | 6/2017 | Dossing |
| 2017/0192889 A1 | 7/2017 | Sato |
| 2017/0201419 A1 | 7/2017 | Garcia |
| 2017/0206017 A1 | 7/2017 | Sun |
| 2017/0214550 A1 | 7/2017 | Kumar |
| 2017/0235649 A1 | 8/2017 | Shah |
| 2017/0242617 A1 | 8/2017 | Walsh |
| 2017/0242719 A1 | 8/2017 | Tsirkin |
| 2017/0244557 A1 | 8/2017 | Riel |
| 2017/0244787 A1 | 8/2017 | Rangasamy |
| 2017/0293450 A1 | 10/2017 | Battaje |
| 2017/0315728 A1 | 11/2017 | Zheng |
| 2017/0322954 A1 | 11/2017 | Horowitz |
| 2017/0337492 A1 | 11/2017 | Chen |
| 2017/0344354 A1 | 11/2017 | Schiefelbein |
| 2017/0364843 A1 | 12/2017 | Haligowski |
| 2017/0371551 A1 | 12/2017 | Sachdev |
| 2018/0006896 A1 | 1/2018 | MacNamara |
| 2018/0024889 A1 | 1/2018 | Verma |
| 2018/0046553 A1 | 2/2018 | Okamoto |
| 2018/0060133 A1 | 3/2018 | Fang |
| 2018/0082053 A1 | 3/2018 | Brown |
| 2018/0107419 A1 | 4/2018 | Sachdev |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0150306 A1 | 5/2018 | Govindaraju |
| 2018/0159745 A1 | 6/2018 | Byers |
| 2018/0165170 A1 | 6/2018 | Hegdal |
| 2018/0218000 A1 | 8/2018 | Setty |
| 2018/0225140 A1 | 8/2018 | Titus |
| 2018/0225216 A1 | 8/2018 | Filippo |
| 2018/0246670 A1 | 8/2018 | Baptist |
| 2018/0246745 A1 | 8/2018 | Aronovich |
| 2018/0247064 A1 | 8/2018 | Aronovich |
| 2018/0267820 A1 | 9/2018 | Jang |
| 2018/0276215 A1 | 9/2018 | Chiba |
| 2018/0285164 A1 | 10/2018 | Hu |
| 2018/0285223 A1 | 10/2018 | McBride |
| 2018/0285353 A1 | 10/2018 | Ramohalli |
| 2018/0287883 A1 | 10/2018 | Joshi |
| 2018/0288129 A1 | 10/2018 | Joshi |
| 2018/0300653 A1 | 10/2018 | Srinivasan |
| 2018/0302335 A1 | 10/2018 | Gao |
| 2018/0329981 A1 | 11/2018 | Gupte |
| 2018/0364917 A1 | 12/2018 | Ki |
| 2018/0365092 A1 | 12/2018 | Linetskiy |
| 2018/0375728 A1 | 12/2018 | Gangil |
| 2019/0004704 A1 | 1/2019 | Rathi |
| 2019/0065061 A1 | 2/2019 | Kim |
| 2019/0065323 A1 | 2/2019 | Dhamdhere |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignataro |
| 2019/0102226 A1 | 4/2019 | Caldato |
| 2019/0109756 A1 | 4/2019 | Abu Lebdeh |
| 2019/0116690 A1 | 4/2019 | Chen |
| 2019/0132203 A1 | 5/2019 | Wince |
| 2019/0148932 A1 | 5/2019 | Benesch |
| 2019/0156023 A1 | 5/2019 | Gerebe |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213080 A1 | 7/2019 | Alluboyina |
| 2019/0213085 A1 | 7/2019 | Alluboyina |
| 2019/0215313 A1 | 7/2019 | Doshi |
| 2019/0220266 A1 | 7/2019 | Doshi |

(56) References Cited

U.S. PATENT DOCUMENTS

| | | |
|---|---|---|
| 2019/0220315 A1 | 7/2019 | Vallala |
| 2019/0220527 A1 | 7/2019 | Sarda |
| 2019/0235895 A1 | 8/2019 | Ovesea |
| 2019/0250849 A1 | 8/2019 | Compton |
| 2019/0272205 A1 | 9/2019 | Jiang |
| 2019/0278624 A1 | 9/2019 | Bade |
| 2019/0324666 A1 | 10/2019 | Kusters |
| 2019/0334727 A1 | 10/2019 | Kaufman |
| 2019/0335551 A1 | 10/2019 | Williams |
| 2019/0361748 A1 | 11/2019 | Walters |
| 2019/0369273 A1 | 12/2019 | Liu |
| 2019/0370018 A1 | 12/2019 | Kirkpatrick |
| 2020/0019414 A1 | 1/2020 | Byard |
| 2020/0026635 A1 | 1/2020 | Gaber |
| 2020/0034193 A1 | 1/2020 | Jayaram |
| 2020/0034254 A1 | 1/2020 | Natanzon |
| 2020/0065406 A1 | 2/2020 | Lppatapu |
| 2020/0073586 A1 | 3/2020 | Kurata |
| 2020/0083909 A1 | 3/2020 | Kusters |
| 2020/0097324 A1 | 3/2020 | Teh |
| 2020/0150977 A1 | 5/2020 | Wang |
| 2020/0162330 A1 | 5/2020 | Vadapalli |
| 2020/0257519 A1 | 8/2020 | Shen |
| 2020/0310774 A1 | 10/2020 | Zhu |
| 2020/0310915 A1 | 10/2020 | Alluboyina |
| 2020/0344326 A1 | 10/2020 | Ghosh |
| 2020/0356537 A1 | 11/2020 | Sun |
| 2020/0412625 A1 | 12/2020 | Bagarolo |
| 2021/0011775 A1 | 1/2021 | Baxter |
| 2021/0029000 A1 | 1/2021 | Mordani |
| 2021/0042151 A1 | 2/2021 | Muller |
| 2021/0064536 A1 | 3/2021 | Palmer |
| 2021/0067607 A1 * | 3/2021 | Gardner ............... H04L 41/082 |
| 2021/0126839 A1 | 4/2021 | Rudrachar |
| 2021/0141655 A1 | 5/2021 | Gamage |
| 2021/0157622 A1 | 5/2021 | Ananthapur |
| 2021/0168034 A1 | 6/2021 | Qian |
| 2021/0263779 A1 | 8/2021 | Haghighat |
| 2021/0271506 A1 | 9/2021 | Ganguly |
| 2021/0382739 A1 | 12/2021 | Guo |
| 2021/0406079 A1 | 12/2021 | Atur |
| 2022/0107842 A1 | 4/2022 | Jiang |
| 2022/0261281 A1 | 8/2022 | Bequet |

OTHER PUBLICATIONS

Fast and Secure Append-Only storage with Infinite Capacity, Zheng, Aug. 27, 2003.

User Mode and Kernel Mode, Microsoft, Apr. 19, 2017.

Precise memory leak detection for java software using container profiling, Xu, Jul. 2013.

Mogi et al., "Dynamic Parity Stripe Reorganizations for RAID5 Disk Arrays," 1994, IEEE, pp. 17-26.

Syed et al., "The Container Manager Pattern", ACM, pp. 1-9 (Year 2017).

Rehmann et al., "Performance of Containerized Database Management Systems", ACM, pp. 1-6 (Year 2018).

Awada et al., " Improving Resource Efficiency of Container-instance Clusters on Clouds", IEEE, pp. 929-934 (Year 2017).

Stankovski et al., "Implementing Time—Critical Functionalities with a Distributed Adaptive Container Architecture", ACM, pp. 1-5 (Year 2016).

Dhakate et al., "Distributed Cloud Monitoring Using Docker as Next Generation Container Virtualization Technology" IEEE, pp. 1-5 (Year 2015).

Crameri et al., "Staged Deployment in Mirage, an Integrated Software Upgrade Testing and Distribution System", ACM, pp. 221-236 (Year: 2007).

Cosmo et al., "Packages Upgrades in FOSS Distributions: Details and Challenges", ACM pp. 1-5 (Year: 2008).

Burg et al., "Atomic Upgrading of Distributed Systems", ACM, pp. 1-5 (Year: 2008).

Souer et al., "Component Based Architecture forWeb Content Management: Runtime Deployable Web Manager Component Bundles", IEEE, pp. 366-369 (Year: 2008).

Weingartner et al., "A distributed autonomic management framework for cloud computing orchestration." In 2016 IEEE World Congress on Services (Year: 2016).

* cited by examiner

CHECK-IN MONITORING FOR WORKFLOWS

RELATED APPLICATIONS

This application is related to U.S. application Ser. No. 16/888,600 filed May 29, 2020, U.S. application Ser. No. 16/896,094 filed Jun. 8, 2020, U.S. application Ser. No. 16/903,266 filed Jun. 16, 2020, U.S. application Ser. No. 16/915,878 filed Jun. 19, 2020, and U.S. application Ser. No. 17/089,579 filed Nov. 4, 2020, which are incorporated herein by reference for all purposes.

BACKGROUND

Field of the Invention

This invention relates to automating the initialization of network devices, such as servers.

Background of the Invention

In order to deliver a network service to a consumer, such as on a mobile device of a consumer, there are many applications, networking configurations, and other actions that are required to implement the network service, access the data managed by the network service, and to interact with a client application that interacts with the user. In many instances, these actions must be performed at many different data centers that are distributed geographically.

It would be an advancement in the art to facilitate the development and deployment of network services.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
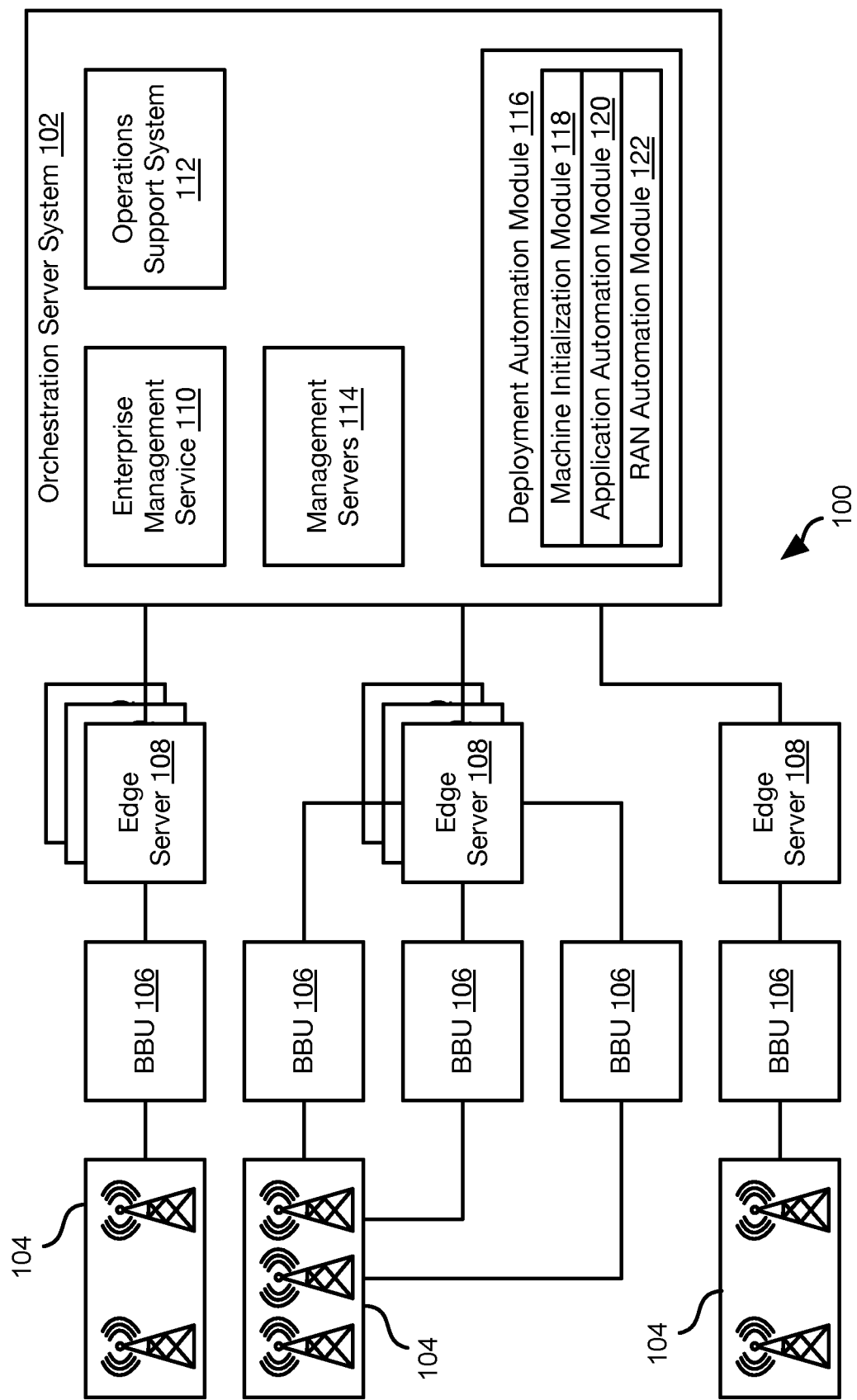
FIG. 1 is a schematic block diagram of a components of a network service and an orchestration server system in accordance with an embodiment of the present invention.

FIG. 1 illustrates an example network environment 100 in which the systems and methods disclosed herein may be used. In particular, an orchestration server system 102 may execute on one or more server computers and implement the systems and methods disclosed herein in order to implement a network service by way of one or more radio antennas 104, such antennas 104 may be configured to communicated wireless signals according to a cellular wireless data protocol (e.g., 4G, 5G, etc.) for implementing a network service to mobile devices of users.

The radio antennas 104 may be coupled to baseband units (BBU) 106 that provides translation between radio frequency signals output and received by the antennas 104 and digital data transmitted and received by edge servers 108 coupled to the antennas 104. For example, each BBU 106 may perform this translation according to any of the cellular wireless data protocols mentioned above. The edge servers 108 may be coupled to the orchestration server system 102 either directly or by way of one or more intermediary servers.

The orchestration server system 102 may implement centralized management services used to manage the edge servers 108 and BBUs 106. For example, these may include enterprise management services 110, operations support systems (OSS) 112, and one or more management servers 114 for services implemented on the edge servers 108.

The orchestration server system 102 may implement a deployment automation module 116 that facilitates deployment of the BBUs 106, edge servers 108, services executing on the BBUs 106 and edge servers 108, and centralized management services implemented by the orchestration server system 102 or other server system 102.

For example, this may include a machine initialization module 118 that detects hardware such as the computing devices implementing BBUs 106 or edge servers 108 and initializes them to receive installation of services. For example, given a computing device configured with an IP address, the machine initialization module 118 may initialize the BIOS (basic input output system), install an operating system, configure the operating system to connect to a network and to the orchestration server system 102, and install an agent for facilitating installation of services and for performing management functions on the computing device at the instruction of the deployment automation module 116. For example, the machine initialization module 118 may use COBBLER in order to initialize the computing device.

The machine initialization module 118 may also discover computing devices on a network and generate a topology of the devices, such as in the form of a directed acyclic graph (DAG). The deployment automation module 116 may then use this DAG to select computing devices for implementing network services and in order to configure a machine to receive installation of a network service.

The deployment automation module 116 may include an application automation module 120 that automates the deployment of an application, such as a container executing an application, on a computing device. The application automation module 120 may implement methods and systems described below relating to the automated deployment and management of applications.

One example application of the systems and methods disclosed herein is a radio area network (RAN) automation module 122 that performs the automated deployment of a network service in the illustrated network environment, including instantiating, configuring, and managing services executing on the BBUs 106, edge servers 108, and orchestration server system 102 in order to implement a RAN in a one-click automated fashion.

Figure 2:
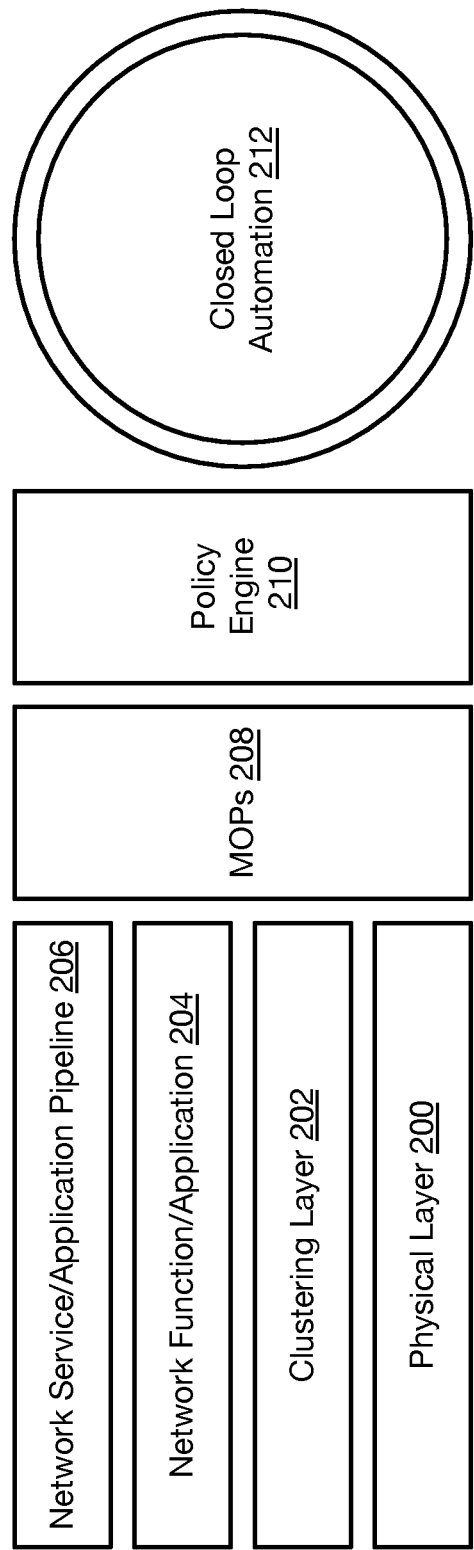
FIG. 2 is a schematic block diagram of layers and external management functions of a network service in accordance with an embodiment of the present invention.

FIG. 2 is a schematic block diagram of layers and external management functions of a network service in accordance with an embodiment of the present invention. At the base, is a physical layer 200 including hardware of a computing device. The physical layer 200 may also include basic software such as BIOS, firmware, operating system, or even a virtual machine executing on the computing device.

A clustering layer 202 resides on the physical layer 200 and includes data structures and software that enables a group of computing devices to act as a cluster. A cluster may be defined as a group of devices that are backups of one another, that provide a service with requests for that service being distributed among devices of the cluster according to a load balancing approach, that together implement a plurality of distinct applications that cooperate with one another to implement a service, or that are associated to one another for a common purpose or according to an arbitrary cluster definition of an administrator. The clustering layer 202 may be implemented by agent software executing on the physical layer 200 that coordinates with the deployment automation module 116 and other devices of a cluster to implement a cluster.

The network function/application layer 204 includes applications executing on the computing devices of a cluster that individually or together with other applications executing on other nodes of the cluster implement a network service, such as access to a database, web server, or other server-based computational function that may be provided as a service to a user or another service of a network environment 100.

A network service/application pipeline layer 206 may include a pipeline of network functions/applications 204 that communicate with one another to implement a more complex network service.

Operations of any of the layers 200-206 may be managed by method and procedures (MOPs) 208 that are independent of the services implemented by the layers and include management functions such as instantiating, upgrading, health checks, monitoring power, restarting, replacing, scaling, and shutting down of the entities implementing a layer 200-26 (also referred to as life cycle management (LCM)).

A policy engine 210 may likewise operate with respect to any of the layers 200-206 and provide logic defining actions performed with respect to some or all of the layers 200-206, such as procedures for implementing backups, handling faults at a particular layer, prioritization of individual MOPs 208, or other policies that an administrator may wish to impose on the operation of any of the layers 200-206.

For example, the policy engine 210 may have access to a topology of an application pipeline created according to the methods disclosed herein. Error messages received from elements of the pipeline may be received and aggregated in chronological order, such as using the approach described in U.S. application Ser. No. 16/561,994 filed Sep. 5, 2019, and entitled Performing Root Cause Analysis in a Multi-Role Application, which is hereby incorporated herein by reference in its entirety. Once a fault is identified, the policy engine 210 may implement an appropriate recovery policy. For example, if a computing device fails, its IP address may be released and assigned to a new computing device. The elements on the failed computing device may be instantiated on a new computing device assigned the IP address. If an element fails, a new element of the same type may be instantiated and configured to take its place. If a pod fails, a new pod may be created and configured to take its place.

Closed loop automation 212 may also be implemented with respect to some or all of the layers. Closed loop automation 212 may include the performance of tasks, verification of performance of tasks, monitoring function, automated actions performed in response to states detected during monitoring, and other actions in order to implement some or all of the layers 200-206 and maintain operation of the layers 200-206.

Figure 3:
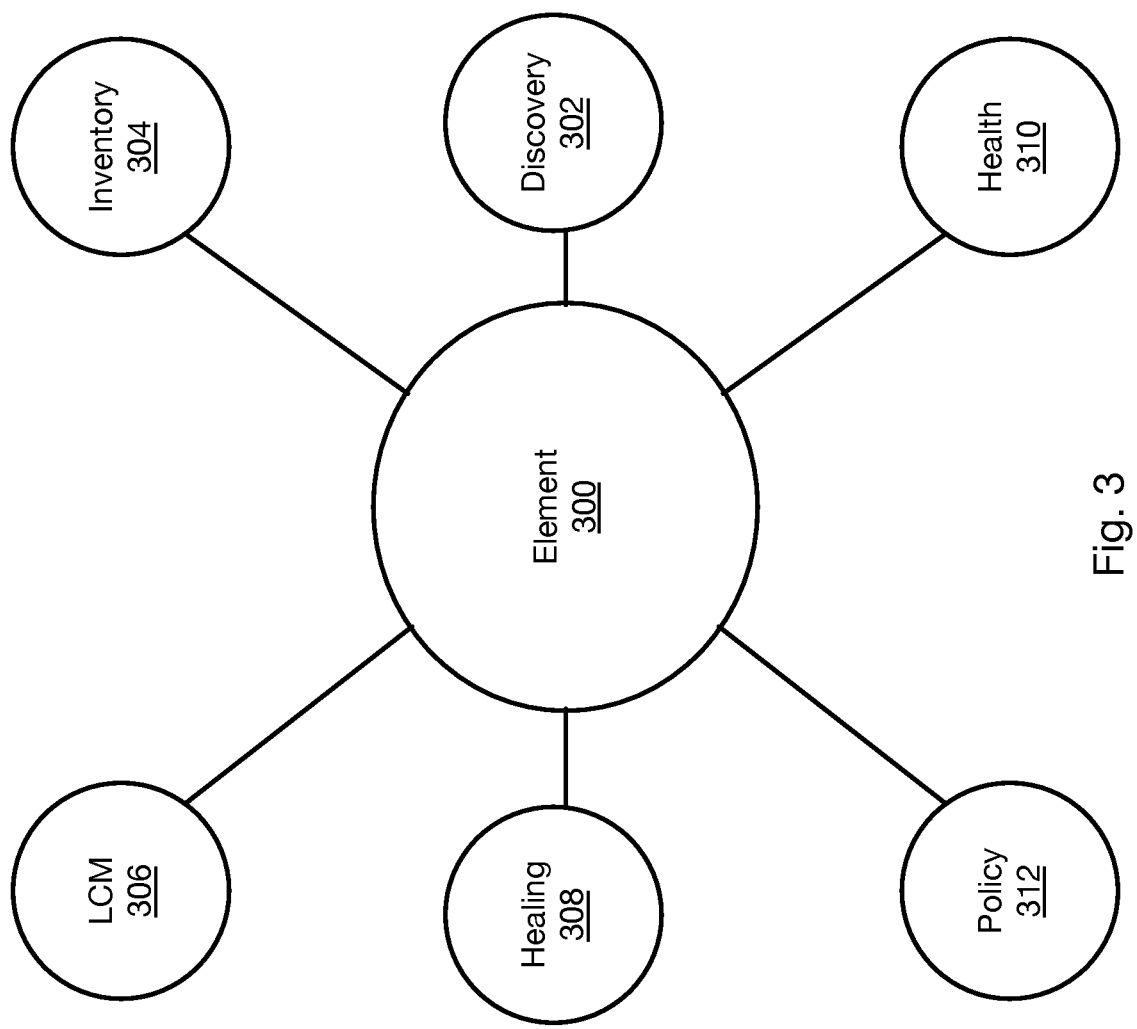
FIG. 3 is a schematic diagram of an element of a network service in accordance with an embodiment of the present invention.

FIG. 3 is a schematic diagram of an element 300 of a network service in accordance with an embodiment of the present invention. Each entity that constitutes one of the layers 200-206 may be embodied as an element 300. Each element 300 may define functions and interfaces used by the deployment automation module 116 to deploy and manage an entity represented by an element 300. An element 300 may be an entity that is a combination of sub-elements 300 and defines functions and interfaces for deploying and managing the combination of sub-elements 300. Accordingly, the deployment automation module 116 may invoke these interfaces and functions in order to deploy and manage an element without requiring any modification of the deployment automation module 116 to adapt to or have data describing the entity represented by the element 300.

For example, an element 300 may define functions and interfaces 302 for discovering the element such that once the element 300 is connected by a network to the deployment automation module 116, the element 300 may be discovered and its identity, type, and other attributes may be provided to the deployment automation module 116.

The element 300 may define functions and interfaces 304 for maintaining a reference to the element 300 in an inventory of elements 300 maintained by the deployment automation module 116. This may include responding to queries from the deployment automation module 116 with responses indicating availability of the element 300, e.g. whether it is assigned and operational.

The element 300 may define functions and interfaces 306 for performing life cycle management (LCM) of the element 300. This may include functions and interfaces for instantiating, upgrading, scaling, restarting, restarting, or de-instantiating the element 300.

The element 300 may define functions and interfaces 308 for performing healing the element 300. This may include functions and interfaces for detecting faults, recovering from faults, restoring non-functioning parts of the element 300, or other actions for restoring or maintaining function of the element 300.

The element 300 may define functions and interfaces for monitoring 310 health of the element 300. This may include functions and interfaces for running diagnostic checks, performance checks, or other evaluations of the state of operation of the element 300.

The element 300 may define functions and interfaces 312 for implementing policy with respect to the element 300. This may include functions and interfaces for receiving a policy for the element 300 and evaluating the policy with respect to a current state of operation of the element 300. The functions and interfaces 312 may define the policies themselves or may be configured to receive and implement policies received from the deployment automation module 116.

Figure 4:
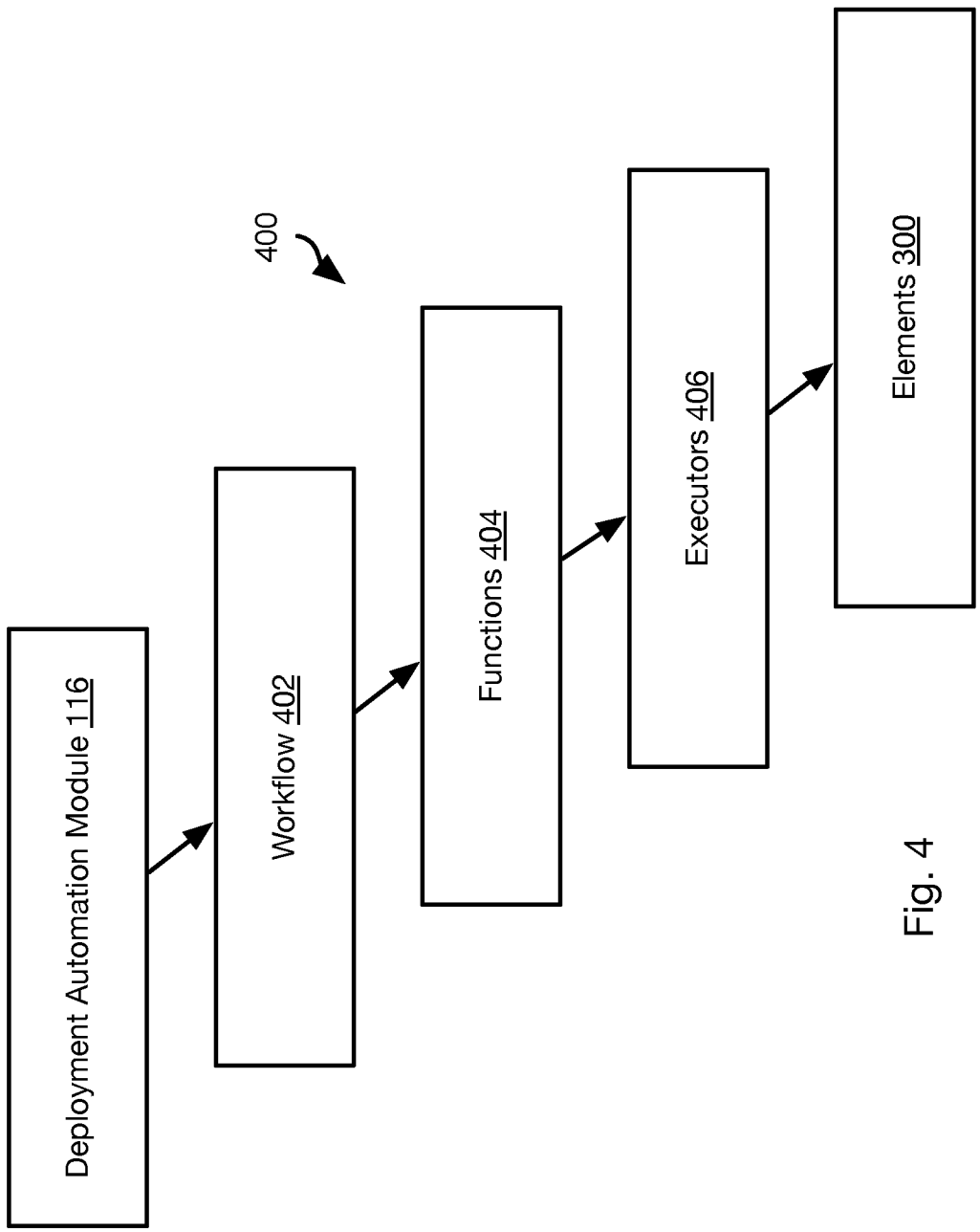
FIG. 4 is a schematic block diagram of a hierarchy for orchestrating a network service in accordance with an embodiment of the present invention.

FIG. 4 is a schematic block diagram of a hierarchy 400 for orchestrating a network service in accordance with an embodiment of the present invention. The deployment automation module 116 may ingest a workflow 402. The workflow defines a series of function calls 404 and possibly an order of execution of the function calls 404. The function calls 404 may invoke executors 406 that operate with respect to an element 300. In particular, the function calls 404 may be functions of instances of elements 300 included in the workflow 402. Accordingly, a workflow 402 may be define performance of function calls 404 for specific elements 300 and possibly the ordering of these functions.

The elements 300 may be entities implementing a network service pipeline, radio area network (RAN), or any complex multi-application deployment and the workflow invokes the functions of these elements 300. As noted above, due to the abstraction of the elements 300, the workflow does not need to specify entity-specific functions. Instead tasks of a workflow 402 including discovery, inventory management, life cycle management, health monitoring, healing, policy implementation and other high-level functions may be invoked by invoking corresponding interfaces and functions 302-312 of the elements 300 of the workflow 402.

Figure 5:
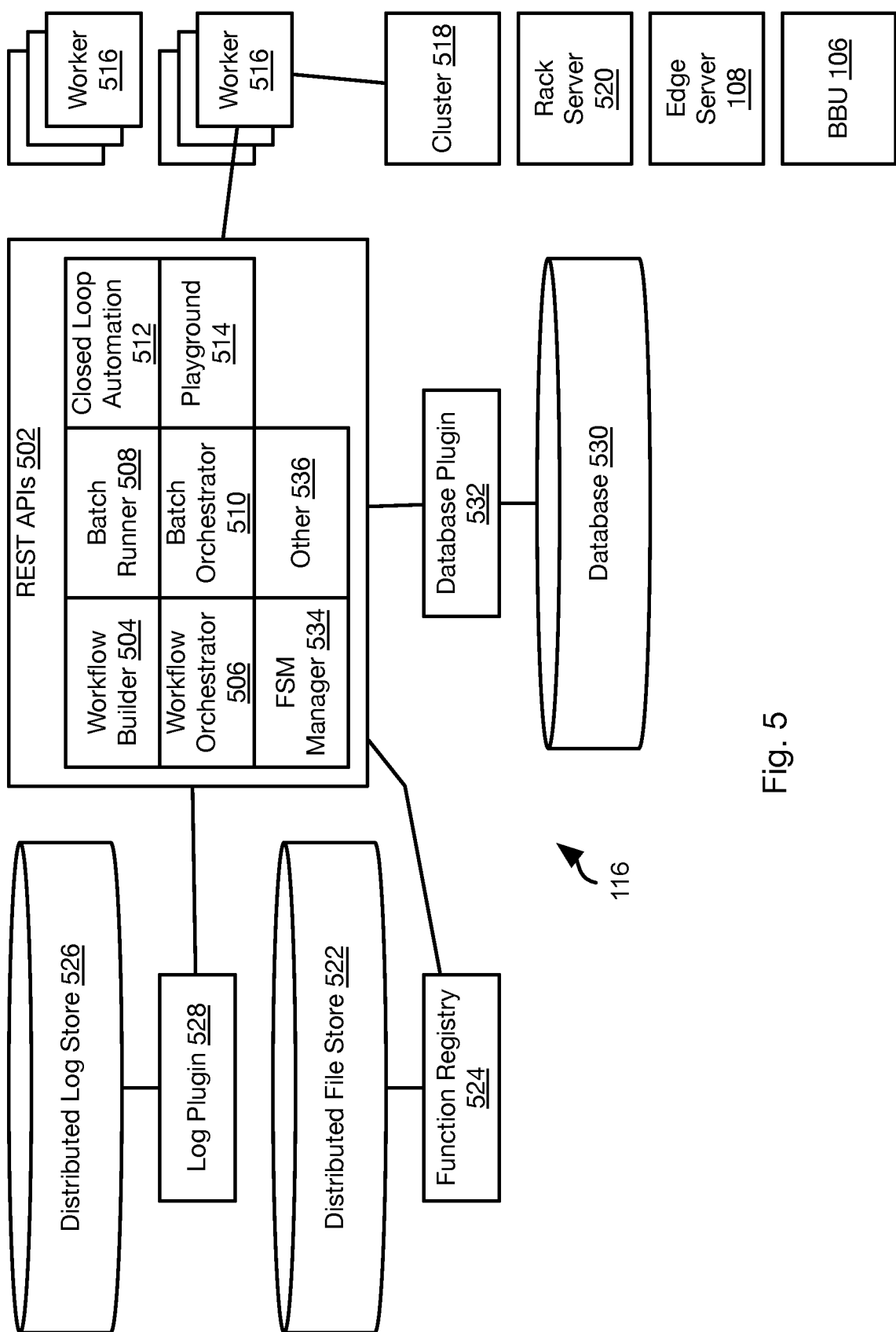
FIG. 5 is a schematic block diagram of APIs and databases for creating workflows implementing a network service in accordance with an embodiment of the present invention.

FIG. 5 is a schematic block diagram of a system for creating workflows implementing a network service in accordance with an embodiment of the present invention. In particular, the deployment automation module 116 may include or access some or all of the illustrated components.

The deployment automation module 116 may include application programming interfaces (APIs) 502, such as representational state transfer (REST) APIs, enabling a user to create and execute workflows 402. For example, a workflow builder 504 may define an interface enabling a user to create, select, and modify workflows 402 (see FIGS. 6 and 7). A workflow orchestrator 506 may implement the functions 404 of a workflow on the elements 300 of a workflow 402.

In many instances, the number of elements 300 and the functions 404 that are performed with respect to elements 300 is very large, on the order of 1000s or even millions. Accordingly, a batch runner 508 may set up batch processing of functions 404 for elements 300 and a batch orchestrator 510 may then execute the functions in batches as defined (see FIG. 9).

The APIs 502 may define closed loop automation 512 APIs that implement closed loop automation 212 of the deployment and management of the elements 300 of a workflow according to the interfaces 302-312 of the elements 300.

Figure 11:
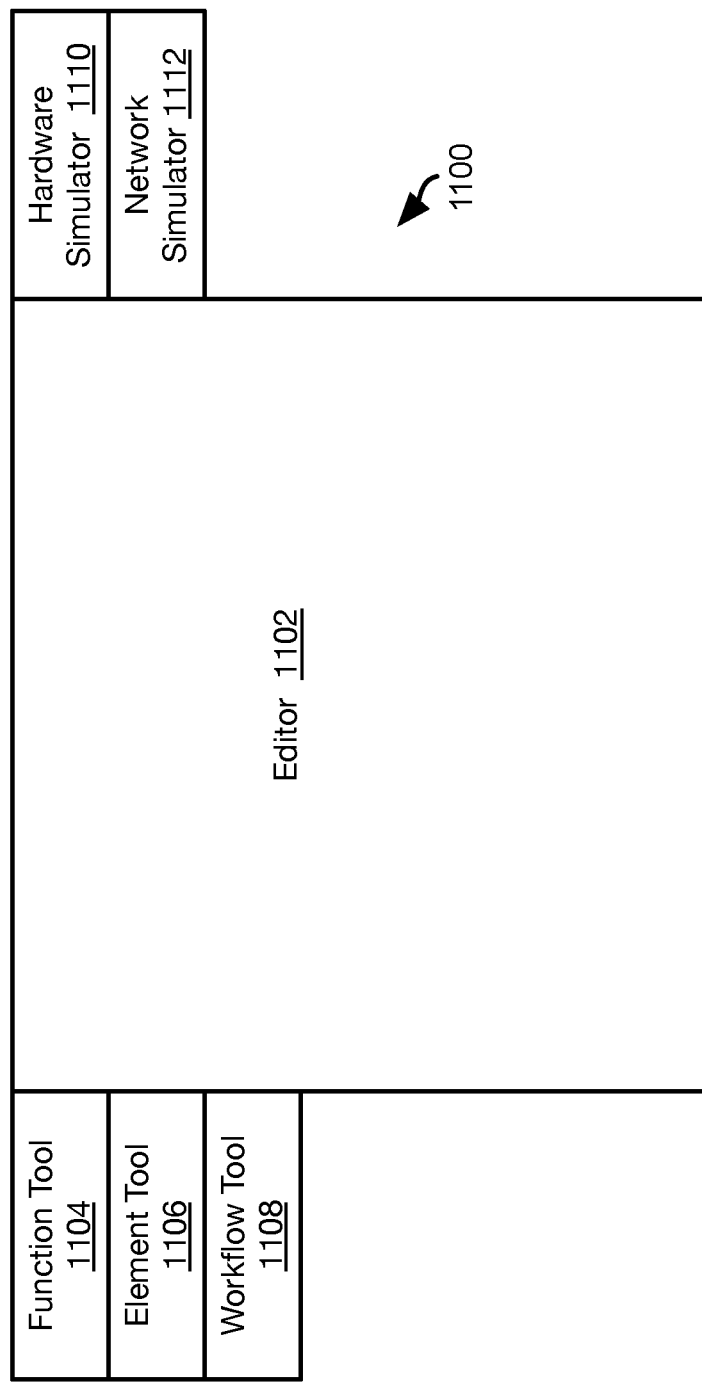
FIG. 11 is a schematic block diagram of a test platform for workflows and functions in accordance with an embodiment of the present invention.

A playground 514 may provide a testbed for the creation and evaluation of elements 300, workflows 402, and functions 404 (see FIG. 11).

Functions 404 of workflows 402, either individually or as parts of batches, may be implemented by workers 516. The workers 516 may be embodied as pods, such as pods according to the KUBERNETES orchestration platform. Alternatively, workers 516 may be processes or threads of execution executing on one or more computing devices of a network environment 100. For example, the workers 516 may execute on clusters 518, a rack server 520, edge server 108, BBU 106, or some other computing device.

The amount of files required to define the functions 404 and elements 300 of a workflow 402 may be very large. Accordingly a file store 522 may be implemented, such as in the form of a database accessed by means of a function registry 524 that maps a function 404 of an element 300 (e.g. a function identifier associated with an element identifier) to a storage location in the file store 522.

In a like manner, the number of files and amount of data generated by the functions 404 and applications instantiated by a workflow 402 may be very large. Accordingly, a distributed log store 526 may be implemented as a distributed database of log store to which functions 404 and applications instantiated by a workflow 402 may write updates too, such as by means of a log plugin 528.

Other data used by the APIs 502 may be stored in a database 530 accessed by means of a database plugin 532. For example, interfaces, templates, pre-defined workflows 402, elements 300, and other data that may be used by a user to define a workflow 404.

In some embodiments, each element 300 may have a state and a corresponding finite state machine that defines transitions between states of the finite state machine in response to events occurring involving the element 300. Accordingly, the REST APIs 502 may include a finite state machine manager 534 for managing the state machine of each instance of any of the elements 300.

Other REST APIs 536 may implement other functions, such as observability of elements (OBF), rule-based access control, cluster federation, and other functions that may facilitate implementation and management of a network service pipeline.

Figure 6:
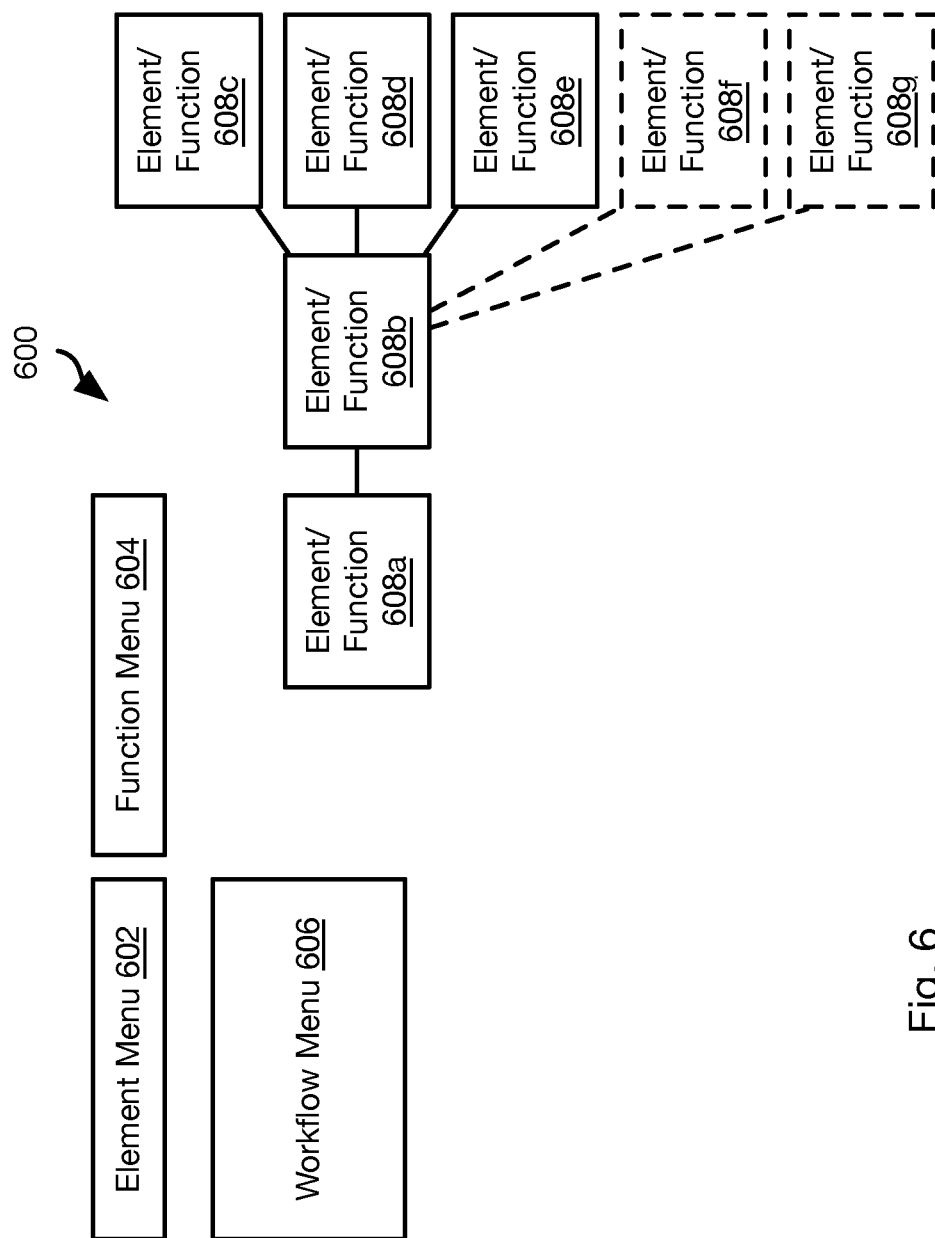
FIG. 6 is a schematic block diagram of an interface for creating workflows in accordance with an embodiment of the present invention.

FIG. 6 is a schematic block diagram of an interface 600 that may be provided by the workflow builder 504 to facilitate creating workflows 402 in accordance with an embodiment of the present invention. The interface 600 may include a menu 602 that enables a user to input a selection of an element 300 from a list of available elements 300. Elements 300 may include a virtual machine, a container, a database (e.g., MONGODB), an application, a router, a switch, a rack switch, relay, or any other element that may be needed to implement a network service. The interface may further include a function menu 604 that enables a user to input a selection of an element 300, e.g., the element selected using the menu 602. This may include any of the interfaces and functions 302-312 described above. For example, where a workflow 402 is to be created that instantiates a network pipeline, the functions selected from the menu 604 may be functions to instantiate the selected element. For example, an element/function (i.e., a selected function for a selected element type) 608a may define instantiating a primary manager of a cluster, element/function 608b may define instantiating a secondary manager of the cluster, element/functions 608c-608e may define instantiating one or more other nodes of the cluster. Other functions for a cluster may include acquiring licenses for software, performing network configuration of the managers and nodes of the cluster, acquiring IP addresses for the cluster and nodes of the cluster, setting up bundles (e.g., bundled applications), and setting up external backup depositories.

Each element/function 608a-608e input by a user may be represented by an icon on the graphical user interface (GUI) 600, such as shown in FIG. 6. Each element function 608a-608e may have configuration parameters such as internet protocol (IP) address, identifier, number of processing cores, amount of memory, amount of storage, etc., to be allocated to the node instantiated by the function 608a-608e. These parameters may be specified by default or may be input by a user, such as by accessing a menu permitting their input by clicking on a representation of a function 608a-608e in the interface 600.

A workflow 402 including any of the functions 404 for any of the elements 300 described herein may be created and configured in the same manner as for the example described above.

In some embodiments, predefined workflows 402 may be selected from a workflow menu 606. A user may then modify the workflow 402. For example, a workflow selected from the workflow menu 606 or created by a user may be modified to include additional element/functions 608f, 608g.

Figure 7:
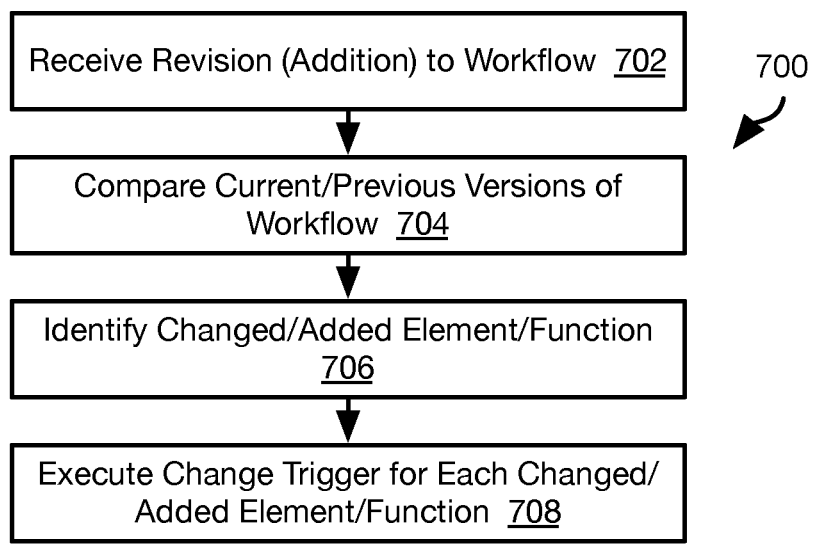
FIG. 7 is a process flow diagram of a method for dynamically modifying a workflow in accordance with an embodiment of the present invention.

Referring to FIG. 7, in some embodiments, workflows 402 may be defined dynamically such that aspects of the modification of the workflow 402 are automated. In particular, there may be many parameters that define a particular element/function 608a-608e. The method 700 may be executed by the workflow builder 504 to automatically reconfigure a workflow 402 in response to modification thereof. A workflow 402 may be implemented dynamically in terms of its structure and its functionality as described blow. In particular, a workflow 402 may be modified according to a type of an element instance, and a size of an element instance. Some of the attributes, e.g., size or health, of an element instance may be determined at runtime or change during runtime such that the workflow 402 may be dynamically changed according, to triggers associated with the changed attributes as described below.

The method 700 may include receiving 702 a revision to a workflow 402, such as addition of one or more other element/functions 608f, 608g. These revisions may also include modifying the parameters of one or more existing element/functions 608a-608g of a workflow 402.

The method 700 may include comparing 704 the modified workflow to the previous version of the workflow and changed or added element/functions may be identified 706 according to the comparison. For example, when the user is done making changes and saves the modified workflow or otherwise invokes step 704, this comparison may be performed.

In some embodiments each element 300 may define triggers for each function thereof. Accordingly, when an element/function is added or a parameter thereof is modified, the trigger corresponding thereto may be executed 708 by the workflow builder 504. The trigger may define functions for dynamically modifying the workflow 402 in response to the modification or addition. For example, where a modification is the addition of an element/function, the trigger may define parameters for defining the new element/function in accordance with other instances of that element function 404 already in the workflow 402. For example, for a new cluster node, these automatically populated parameters may include an identifier, IP address, and relationship to a primary or secondary node of a cluster, or other nodes of the cluster. Triggers may likewise define modifications to other parameters of an element/function or the parameters of other element/functions of a workflow 402 when one of the parameters of the element/function is changed.

In this manner, the user is relieved of the burden of configuring each element/function of a workflow 402 when it is added. This enables a small set of predefined workflows 402 to be scaled and modified according to desires of a user using simple menu interactions and drag-and-drop interactions with icons representing the element/functions of a workflow 402.

The trigger associated with a parameter of an element may also be invoked during execution of a workflow 402. Supposing a first step in a workflow executes a first function on a first element that modifies a first parameter having a trigger associated with it. The parameters of an element, including the first parameter, may each be embodied as a key-value pair, the value being the parameter that may be modified. The workflow orchestrator 506 may detect the change to the parameter and invoke a trigger function associated with the trigger, the trigger function making modifications to one or more other parameters of the first element or one or more second elements associated with the workflow 402 or performing other operations. The workflow orchestrator 506 may block execution of a second step of the workflow until the trigger function has completed execution after which the second step of the workflow is invoked. In some embodiments, the workflow orchestrator 506 only implements the trigger function upon successful modification of the parameter associated with the trigger function, e.g. when the first function returns successfully after execution.

Figure 8:
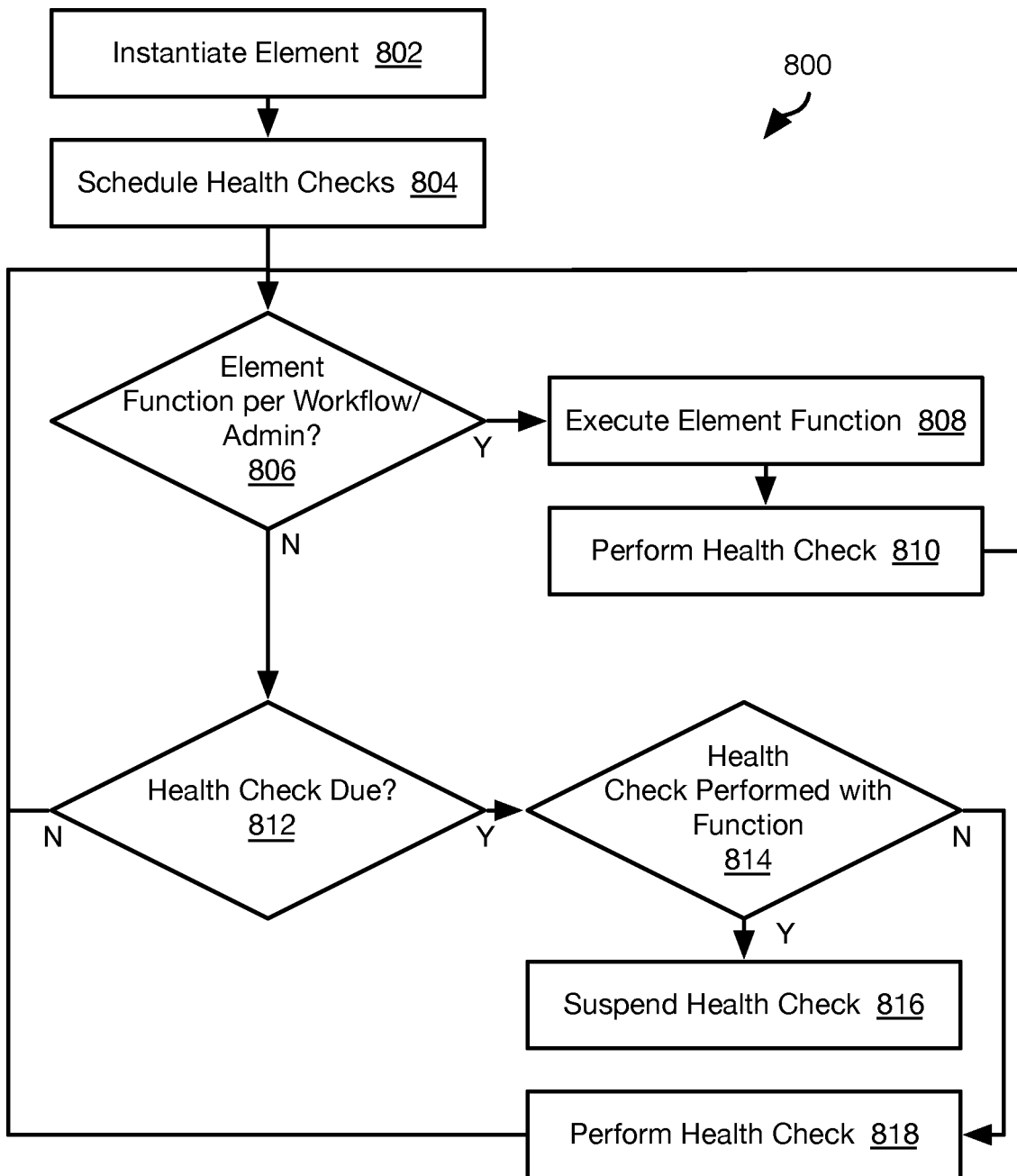
FIG. 8 is a process flow diagram of a method for performing health checks on an element in accordance with an embodiment of the present invention.

FIG. 8 is a process flow diagram of a method 800 for performing health checks on an element in accordance with an embodiment of the present invention. This may include executing the functions 310 for evaluating the health of the element 300 as described above with respect to FIG. 3. The health evaluations according to the functions 310 may be invoked by the deployment automation module 116 or by the element 300 itself following instantiation. The illustrated method 800 improves the efficiency of such health checks.

The method 800 may include instantiating 802 an element 300. The method 800 may further include scheduling 804 health checks. For example, the element 300 may itself be configured to invoke the health evaluation functions 310 at a predefined period. Alternatively, the deployment automation module 116 may schedule 804 performance of the health checks or instruct another element 300 to perform the health checks.

Following instantiation, various functions of an element 300 may be invoked, such as any of the LCM functions. In some embodiments, if a function of an element 300 is found 806 to be invoked on an instance of that element 300, that function is executed 808 and a health check is also performed 810 using the health evolution function for that instance of the element 300.

If a health check is found 812 to be due for the instance of the element 300, the method 800 may include evaluating 814 whether a health check was already performed, such as part of executing 808 another function at step 810. For example, if a health check performed with execution 808 of another function is performed within a threshold time period of a scheduled health check, the scheduled health check is suspended 816. For example, the threshold time period may be defined as a fraction of the period between scheduled health checks, e.g. from 5 to 25 percent.

If the evaluation of step 814 is negative (no health check following function execution within the threshold time period from the scheduled time), the health check is performed 818.

Figure 9:
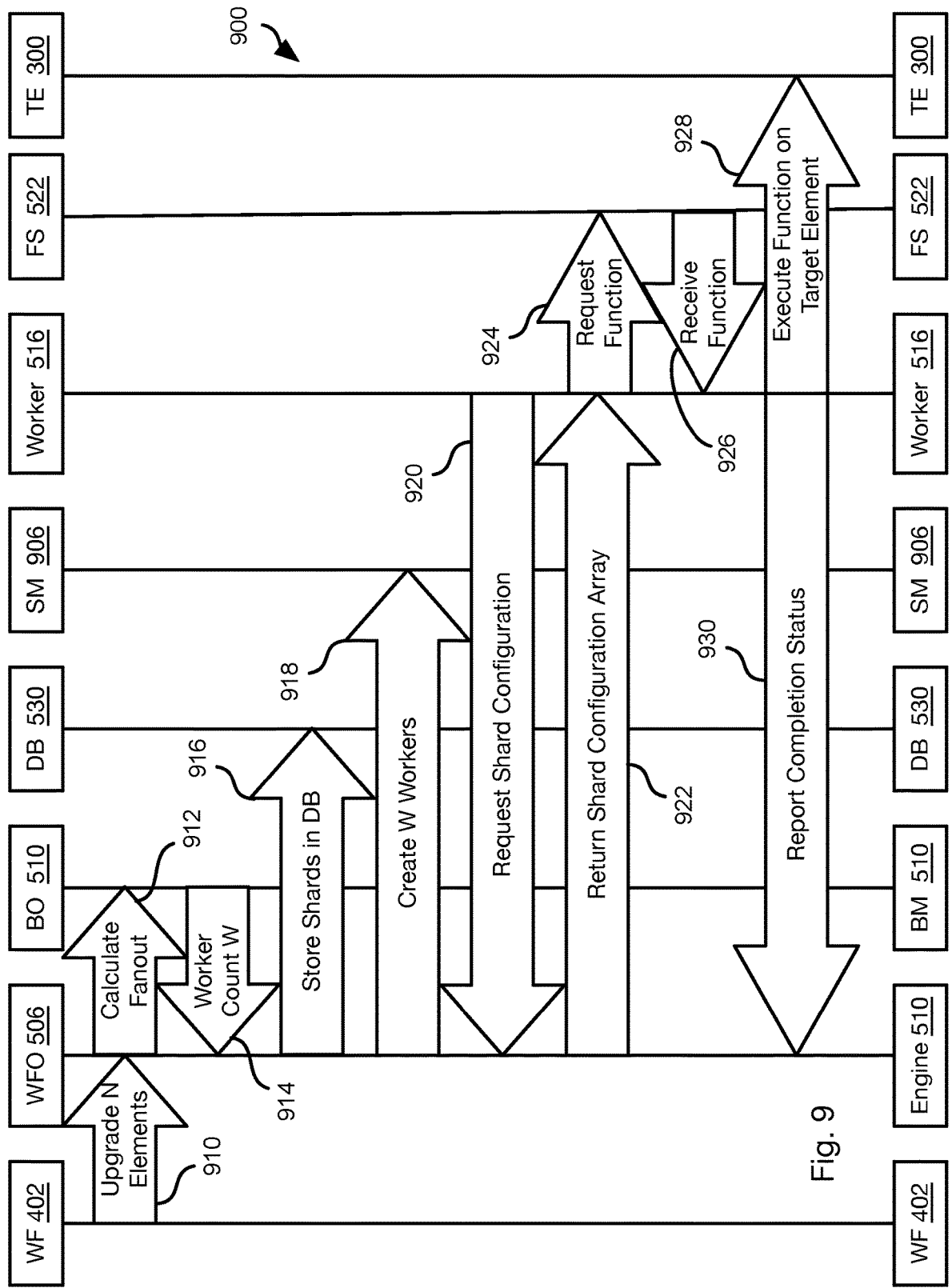
FIG. 9 is a process flow diagram of a method for batch processing functions for large numbers of elements in accordance with an embodiment of the present invention.

FIG. 9 is a process flow diagram of a method 900 for batch processing functions for large numbers of elements in accordance with an embodiment of the present invention. The method 900 may be performed by the deployment automation module (DAM) 116, such as using the workflow orchestrator (WFO) 506 batch orchestrator (BO) 510. Various other entities are involved in the method 900, including a workflow (WF) 402, the database (DB) 530, a spawning manager (SM) 906, worker 516, file store (FS) 522, and a plurality of target elements (TE) 300.

The method 900 may include receiving 910 an instruction to perform a function with respect to N elements 300. In the illustrated example, this function is upgrading, though any function ascribed herein to an element 300 may also be performed. In a typical application, N is very large, on the order of 1000s, 10,000s, or millions. The instruction 910 may be received from a user or received as part of processing a workflow 402.

The workflow orchestrator 506 receives the instruction and, in response, may calculate 912 fanout. This may include determining how many of the target elements 300 will be processed according to the function by a worker. The fanout may be static for all types of elements 300, defined for a particular type of element 300, defined for a particular function 302-312, defined for a particular function 302-312 of a particular type of element 300, or be determined based on some other criteria, which may be dynamic, such as a function of the value of N or current loading of workers 516 of the deployment automation module 116.

The batch orchestrator 510 may return 914 a worker count W that is a number of workers that are available to perform the function with respect to the N target elements 300. The work flow orchestrator 506 may then divide the N target elements 300 into shards such that each shard has approximately (e.g., +/−10) N/W elements 300 assigned to it. Each shard may include element identifiers of the target elements 300 assigned to it and may itself be assigned a shard identifier. The shards may be stored 916, such as in the database 530.

The workflow orchestrator 506 may then invoke 918 the creation of W workers. For example, a spawning module 906 may be programmed to generate workers 516 in response to receiving the instruction from step 918. Upon instantiation, the workers may each request 920 a shard from the workflow orchestrator 506, which may then return 922 a shard configuration array, e.g., an array of target element identifiers along with an identifier of the function to be performed with respect to the target elements 300 referenced by the target element identifiers.

The worker 516 may then request 924 the function, e.g. a script or executable, corresponding to the function identifier received at step 922, from the file store 522. The worker 516 then receives 926 the function and executes 928 the function on each of the target elements 300 reference in the shard configuration array received at step 922. Upon completion of execution of the function with respect to each target element 300 referenced by the shard, the worker 516 reports 930 completion to the workflow orchestrator 506. When all workers 516 complete processing of their shards, the instruction received at step 902 may be complete.

Figure 10:
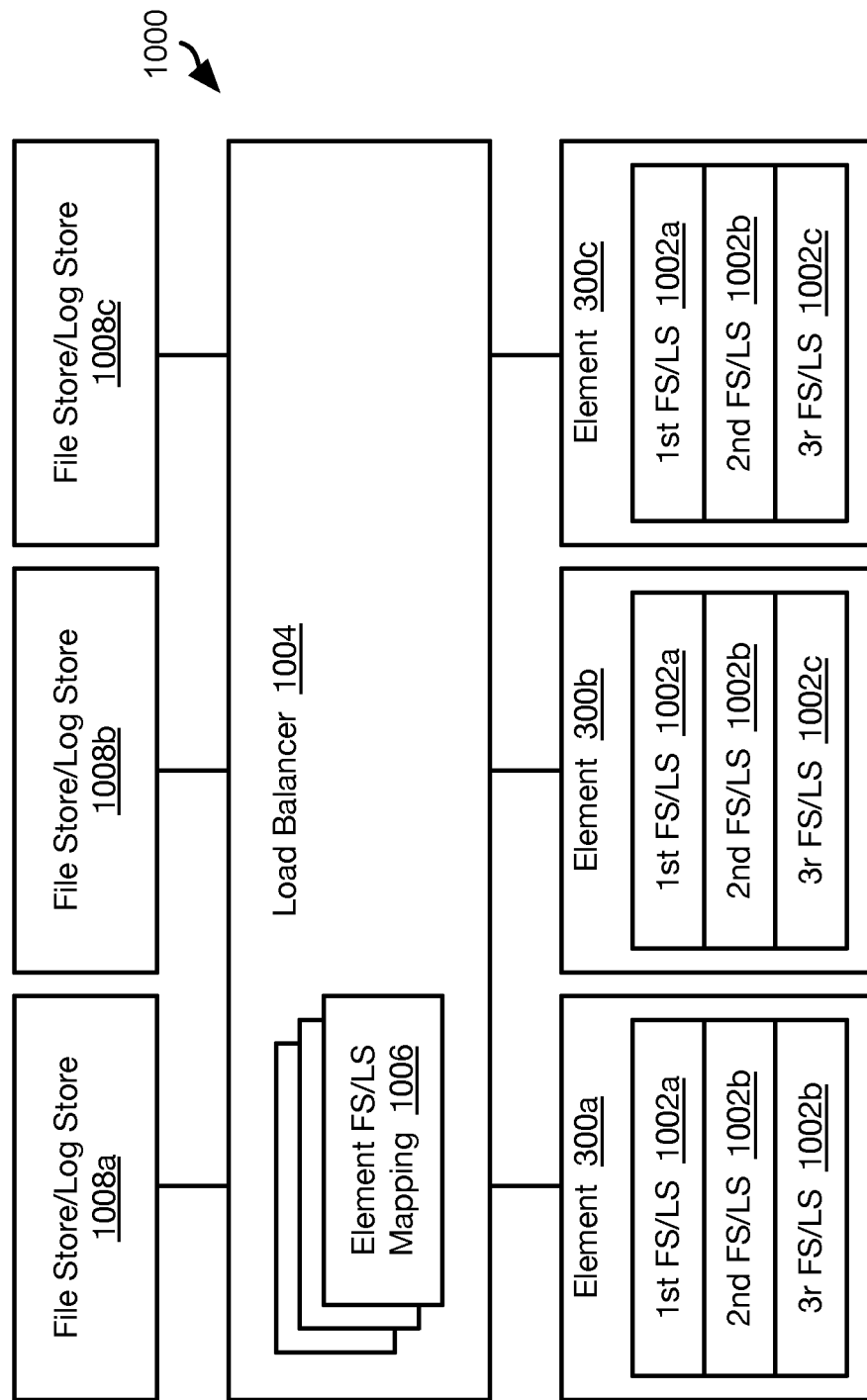
FIG. 10 is a schematic block diagram illustrating an approach for implementing file stores and log stores in accordance with an embodiment of the present invention.

FIG. 10 is a schematic block diagram illustrating an approach 1000 for implementing file stores 522 and log stores 526 in accordance with an embodiment of the present invention. In the foregoing description, the relationship of elements 300a, 300b, 300c is described with respect to reading from file stores 1008a, 1008b, 1008c. It shall be understood that writing to log stores may be distributed in a like manner.

Each element 300a, 300b, 300c may be configured with a list of file store identifiers 1002a, 1002b, 1002c indicating a primary file store, secondary file store, and a tertiary file store. Other numbers of file stores may be used with three being an example. Each element 300a, 300b, 300c will attempt to read from the file store referenced by its primary identifier 1002a, followed by attempting to read from that referenced by the secondary identifier 1002b if not successful, followed by attempting to read from that referenced by the tertiary identifier 1002c if not successful.

The file stores 1008a may be distributed. The computing devices of a network environment 100 may be distributed in different server racks, different buildings, different cities, or even different countries. Accordingly, the functions 302-312 of the elements 300 of a workflow 402 may be stored in copes distributed on various computing devices of the network environment, each copy being one of the file stores 1008a-1008c. Each element 300a-300c may therefore be configured to request files from a primary file store closest to it, with back up file stores referenced as secondary and tertiary where the primary file store is not available Requests to read from the file store 522 may be routed through a load balancer 1004. The load balancer 1004 may include mappings 1006 for each element 300a-300c, e.g. identifiers of the primary, secondary, and tertiary file stores 1002a-1002c. Accordingly, the load balancer 1004 may route request to read from the file store 522 according to a load balancing approach that prioritizes the primary file store of the requesting element 300a-300c as indicated in the mapping 1006 for the requesting element 300a-300c but may route to the secondary or tertiary file store, or possibly some other file store 1008a-1008c based on loading, e.g. if latency of the primary file store is high such that another file store 1008a-1008c may provide lower latency.

FIG. 11 is a schematic block diagram of a test platform 1100 for workflows and functions in accordance with an embodiment of the present invention. The test platform 1100 may include an editor 1102 that may be a word processor for inputting scripts or other computer code, a graphical user interface for assembly workflows (see FIG. 6), or other interface for creating functions, elements, workflows, or other executables. The test platform 1100 may include a tool 1104 for editing functions, a tool 1106 for editing elements, and a tool 1108 for editing workflows. Each tool 1104-1108 may include user interface elements enabling a user to create functions, elements, or workflows.

The platform 1100 may further include simulators. For example, a hardware simulator 1110 may simulate the function of a computing device, BBU, drone, or other hardware device. Accordingly, a function, element, or workflow that is defined for implementation for a hardware device may be simulated using the simulator 1110 for that hardware device. The test platform 1100 may further include a network simulator 1112 that simulates a network, e.g. network protocols, network latency, etc. Accordingly, a topology of elements 300 that are separate by a network may be tested by simulating execution on simulated hardware devices connected by a simulated network.

Once a function, element, or workflow created by a user has been created and tested, it may then be deployed by the deployment automation module 116 according to the systems and method described herein.

Figure 12:
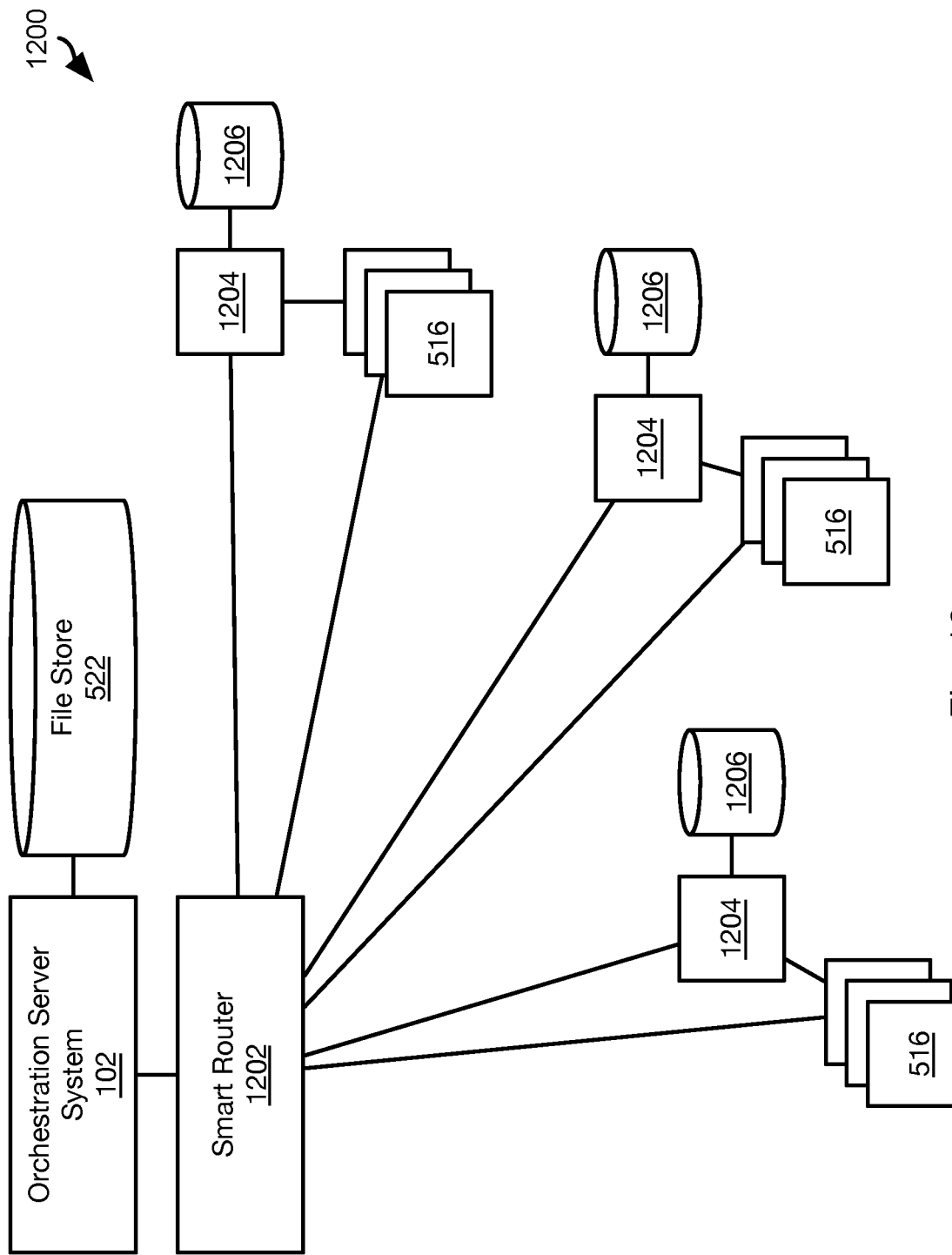
FIG. 12 is a schematic block diagram of a distributed file store in accordance with an embodiment of the present invention.

Referring to FIG. 12, in some embodiments, the distribution of files, such as executables for the functions to be executed by or with respect to elements 300 of a workflow 402, may be performed using the illustrated system 102.

A smart router 1202 may be coupled to various local distributors 1204. The local distributors 1204 may be embodied as applications executing within pods, e.g. KUBERNETES pods, executing throughout a network environment. The distributors 1204 may host or access a local database 1206. The local database 1206 may be a copy of the file store 522 or a portion thereof. For example, given the elements instances in proximity to the local distributor 1204, the portion of the file store 522 may include data from the file store 522 relating to those elements, e.g. executables and data for performing the functions of those element instances. Proximity to the local distributor 1204 may mean located in the same sub-network, or having a network connection to the local distributor 1204 having latency below a threshold.

Workers 516 may request data from the file store 522. These requests may be received by the smart routers 1202, which identifies the local distributor 1204 that is either (a) having a lowest network latency connection to the requesting worker 516 or (b) is more available (lower latency due to lower loading) to distribute files than the local distributor 1204 with lowest network latency. For example, the smart router 1202 may include a load balancer 1004 as described above with respect to FIG. 10 such that the local distributor 1204 is selected according to network latency and loading as described above.

The request is then routed by the smart router 1202 to the selected local distributor 1204, which then provides the requested data to the worker 516 that generated the request.

Figure 13:
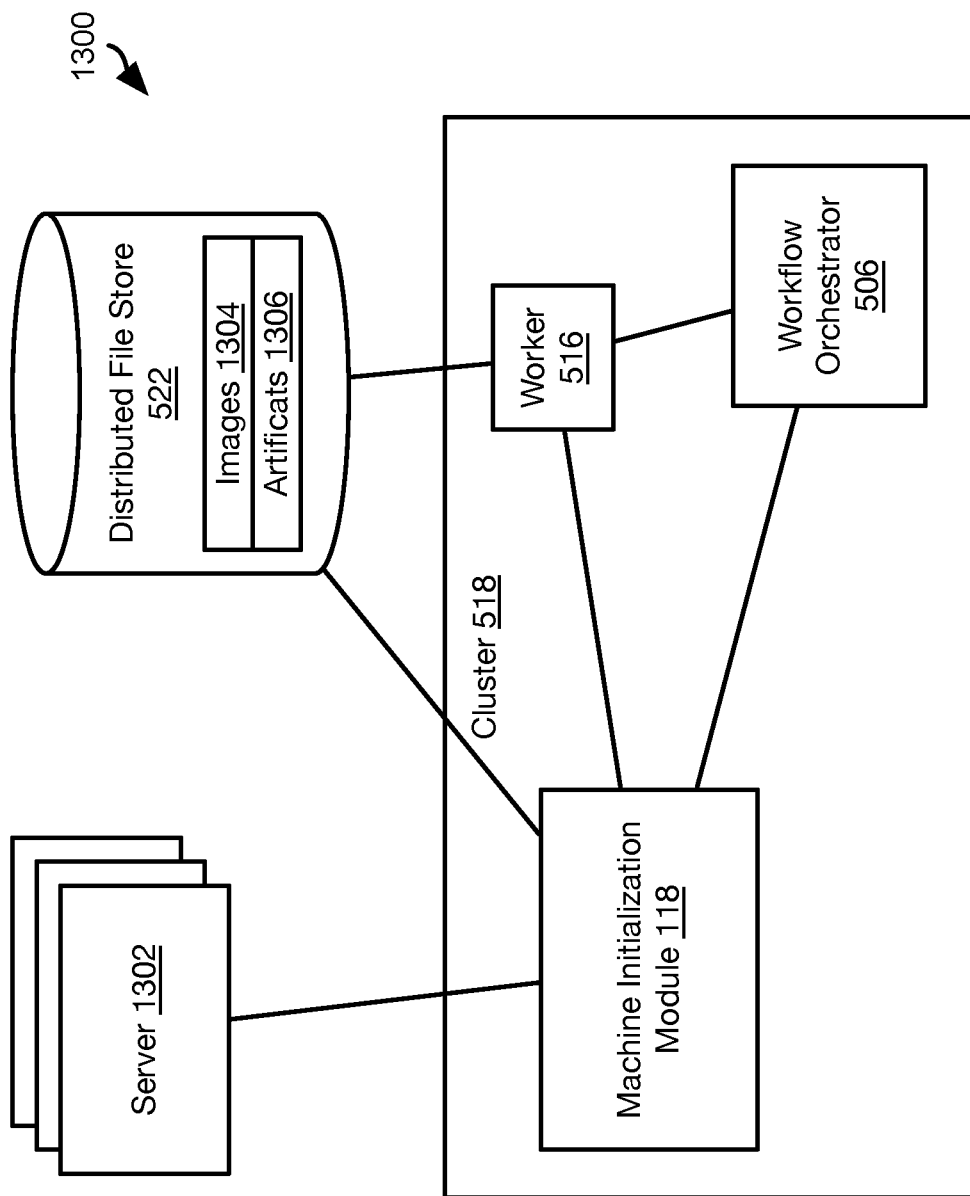
FIG. 13 is a schematic block diagram of a system for initializing servers in accordance with an embodiment of the present invention.

FIG. 13 illustrates a system 1300 that may be used to implement the functionality of the machine initialization module 118. The machine initialization module 118 may operate with respect to servers 1302 that are "bare metal," i.e. have no operating system, kernel, or other software installed thereon other than firmware stored in non-volatile RAM on the device. This firmware will include a basic input output system (BIOS) as well as firmware on components of the server 1302 such as a network adapter (e.g., network interface card (NIC)), hard disk drive (HDD), solid state drive (SSD), redundant array of independent disks (RAID), just a bunch of disks (JBOD), field programmable gate array (FPGA), baseboard management controller (BMC), Non-Volatile Memory Express (NVME) controller, or other component of the server 1302. Although the foregoing description makes reference to a server 1302, any computing device, such as a router, switch, endpoint (personal workstation, mobile computing device, internet of things (IOT) device, etc.), or any other computing device that may communicate over a network.

The machine initialization module 118 itself may be structured as an application that may execute on a node of a cluster 518. The machine initialization module 118 may operate on the same cluster 518 or a different cluster from a cluster hosting the workflow orchestrator 506 and one or more workers 516 implementing functions of a workflow being managed by the workflow orchestrator 506 according to the methods described herein. Workers 516 as described herein may be a pod, such as a KUBERNETES pod.

The machine initialization module 118 may access the distributed file store 522 to obtain images 1304 of operating systems and other executables to be instantiated on a server 1302. The distributed file store 522 may also store artifacts 1306 that are likewise executables or other data that are used by the machine initialization module 118 to initialize a bare metal server 1302.

Figure 14:
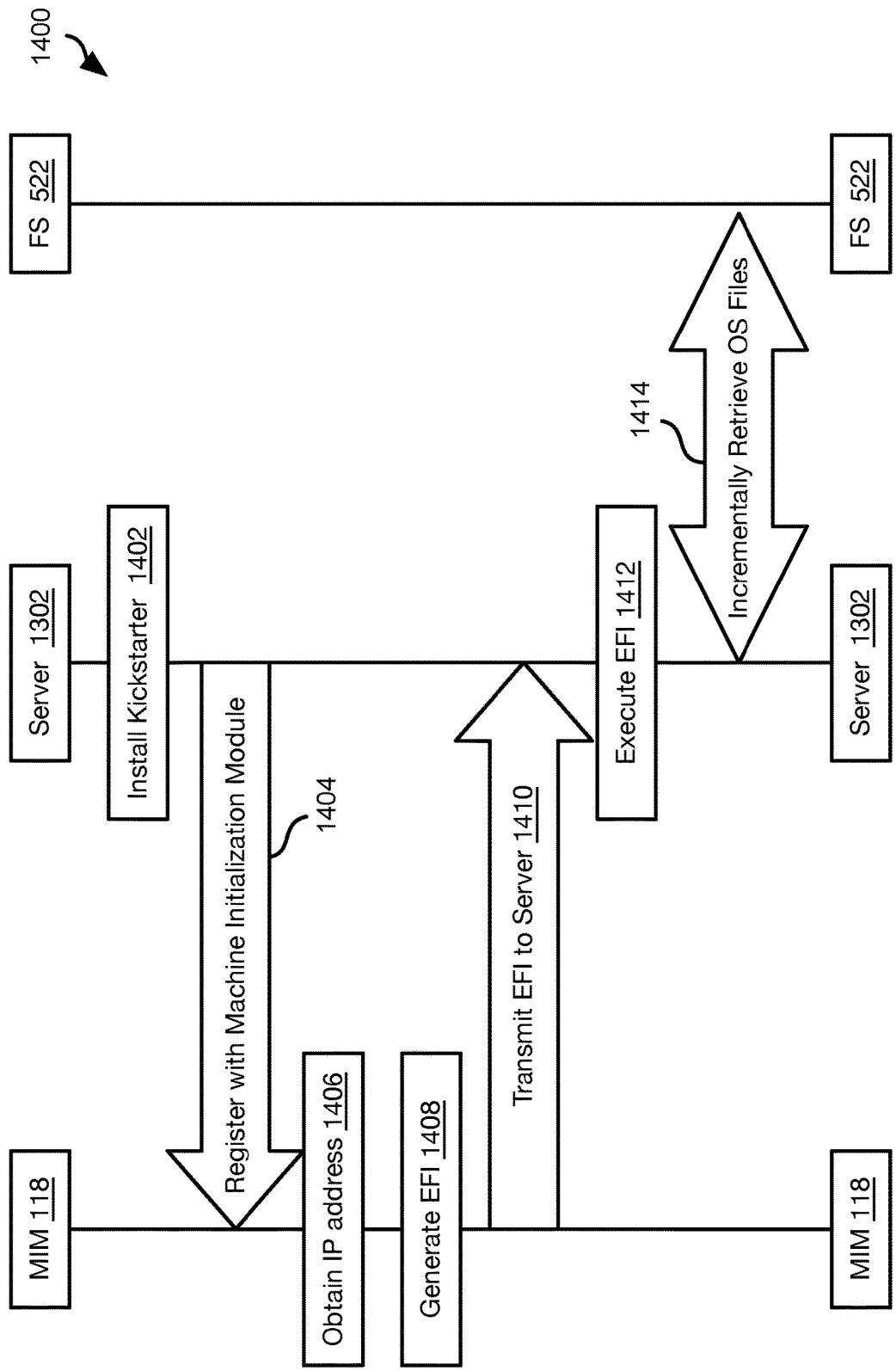
FIG. 14 is a process flow diagram of a method for initializing a server in accordance with an embodiment of the present invention.

FIG. 14 illustrates a method 1400 for initializing a server 1302. The method 1400 may begin with installing 1402 of a kickstarter executable on the server 1302. The kickstarter may correspond to the configuration of the server 1302. The configuration of the server 1302 may be represented using a JAVASCRIPT Object Notation (JSON) file that describes the hardware, firmware, and/or software versions of the server 1302. The JSON file may further include links to a kickstarter file that corresponds to the needs of an application to be installed on the server system 1302, that corresponds to the SKU of the server system 1302, or is configured based on some other criteria. For example, there may be a kickstarter associated with each SKU (stock keeping unit) defining a type of server 1302. Accordingly, the kickstarter installed at step 1402 may be that which corresponds to the SKU of the server 1302. The kickstarter may include a profile of the server 1302, such as according to the Basic, EPA-1, EPA1-test, and/or EPA2 system profile types.

The kickstarter may include a configuration file that configures the server 1302 to register with the machine initialization module 118. Since the server 1302 is not configured with an operating system or an IP (internet protocol) address, the kickstarter may include computer instructions that instruct the server 1302 to communicate with the machine initialization module (MIM) 118 using the baseboard management controller (BMC) IP address with which the server 1302 was configured by a manufacturer. The kickstarter may include an IP address for the machine initialization module 118 or that of some other component that is programmed to route communications from a kickstarter to the machine initialization module 118. Alternatively, the request to register may be broadcast and detected by a component in a network environment that routes the request to the machine initialization module 118. Installing 1402 of the kickstarter may be performed manually by a human operator or by a component coupled to a network to which the server 1302 is connected when installed in a rack, datacenter, or other facility.

The server 1302 executes the kickstarter, which causes the server 1302 to register 1404 with the machine initialization module 118 by communicating over the network to the IP address included in the kickstarter. Registering may include providing the BMC IP address of the server 1302 to which the machine initialization module 118 may address subsequent communications.

The machine initialization module 118 may obtain 1406 an IP address ("the server IP address") to assign to the server 1302 and generate 1408 an extensible firmware interface (EFI) image including the IP address. The IP address may be assigned at step 1406 according to a workflow 402. For example, if the server 1302 is (or hosts) an element instance created according to a function 404 workflow 402, the parameters of the function 404 may include a statically or dynamically assigned IP address for the server 1302. Alternatively, the IP address may be assigned according to an IP address management (IPAM) algorithm executed by the machine initialization module 118, workflow orchestrator 506, or other component in a network environment. In particular, the method 1400 may be executed independently from the workflow orchestration approaches described herein such that the IP address is obtained according to an IPAM algorithm according to any approach known in the art.

The machine initialization module 118 may generate 1408 an executable file including the IP address. In some embodiments, the executable file may be an extensible firmware interface (EFI) image. The executable file may be generated according to the workflow used to select the IP address. The executable file may further include network information such as an IP address for a network gateway to be used by the server 1302, e.g. a node in a network domain including the IP address assigned to the server 1302. The executable file may further contain instructions for configuring the server 1302 to connect to a virtual local area network (VLAN).

In some embodiments, the EFI image may include executable code instructing the server 1302 to retrieve and install an operating system kernel from a specified IP address. The EFI image itself may be configured as a bootstrap kernel from which the server system 1302 may boot itself up. The EFI image may include executable code instructing the server 1302 to retrieve and execute firmware upgrade files for the BIOS, network adapter, HDD, SSD, BMC, BIOS, NIC, RAID, JBOD, NVME controller, FPGA, or other component of the server 1302. Upgrading of firmware or other operations instructed by the EFI image may further include flashing custom images on any of these components or otherwise configuring these components, such as a RAID or JBOD. The EFI image may include executable code instructing the server 1302 to retrieve operating system files for installing an operating system on the server 1302. The EFI image may be formatted as an ISO (International Organization for Standardization) image that can be mounted as a disk to be booted up from on the server 1302. The EFI image is preferably small, such as less than 3 MB. For example, an ISO file size of 2.12 MB has been found to be achievable.

In some embodiments, the EFI image may be obtained from a boot configuration file including the above-described instructions to configure the server IP address, network gateway, and retrieve and install the operating system kernel. The boot configuration file may further include instructions to connect to a virtual local area network (VLAN). The boot configuration file may be written in IPXE (an open source implementation of the Preboot Execution Environment client firmware and bootloader) scripting language and using IPXE syntax. This IPXE scripting language may be compiled using IPXE source code to obtain a bootable EFI image that packs the information of the boot configuration file in a form that can be executed by an IPXE bootloader on the server 1302 in either legacy BIOS or EFI mode.

The IPXE bootloader is typically a small kernel that includes drivers for the hardware of the server 1302 and has the ability to configure new hardware of different types including networking, storage, and the like. In the illustrated embodiment, the ability of the IPXE bootloader to configure a network interface is used to configure the server IP address and network gateway of the server 1302 and may also be used to configure the server 1302 to connect to a VLAN.

The EFI image may be converted into a bootable ISO file. The BMC of the server 1302 may be capable of mounting an ISO file either through an API (application programming interface) call or manual intervention. In some embodiments, a boot order on the server 1302 may be modified such that the server 1302 boots from the bootable ISO file including the EFI image. For example, the kickstarter may be programmed to modify the boot order in this manner.

The bootable ISO file may include both the EFI image and a bootloader, such as the "isolinux.bin" bootloader. The bootloader may contain the encoded form of the configuration file that will be executed on the serer 1302 during the boot load process where the bootloader successively attempts to configure each interface according to the EFI image (including the network interface as described above) and tries to retrieve the operating system kernel according to instructions in the EFI image. Once the bootloader successfully retrieves the operating system kernel, it uses this interface to install the rest of the OS, as described below with respect to FIG. 15.

The bootloader, such as isolinux.bin, may be added to the ISO file including the EFI image to perform bootloading of the hardware of the server 1302. The EFI image (e.g., an ipexe.efi file) interacts with the EFI BIOS to do an initial boot, recognize EFI capabilities, and present the EFI capabilities to the kernel for a Stage 2 booting of the kernel in EFI mode. This EFI image may be placed in the file store 522 where it is accessible via an HTTP (hypertext transport protocol) server (or an HTTP secure (HTTPS) server).

The machine initialization module 118 transmits 1410 the EFI image (e.g., ISO file including the EFI image) to the server 1302. The server 1302 receives the EFI image and executes 1412 it. This may include mounting the ISO image and executing the bootloader in the ISO image. The bootloader processes the EFI image to configure the network interface of the server 1302 and retrieve and install an operating system kernel as described above. In some embodiments, the EFI image may be executed by a VMCLI (virtual machine command line interface) utility on the server 1302.

As a result of executing the EFI, the server 1302 is configured with an IP address for itself, an IP address of a network gateway to be used by the server 1302, an operating system kernel, and with instructions to download an operating system from a specified source IP address, such as that of the file store 522. In some embodiments, the EFI image includes instructions causing the bootloader to incrementally retrieve 1414 the operating system. For example, instead of having to retrieve a 2 GB ISO file including an operating system image, the EFI image may include instructions to download smaller installation packages implementing installation of the operating system in order to reduce loading of the file store 522.

Figure 15:
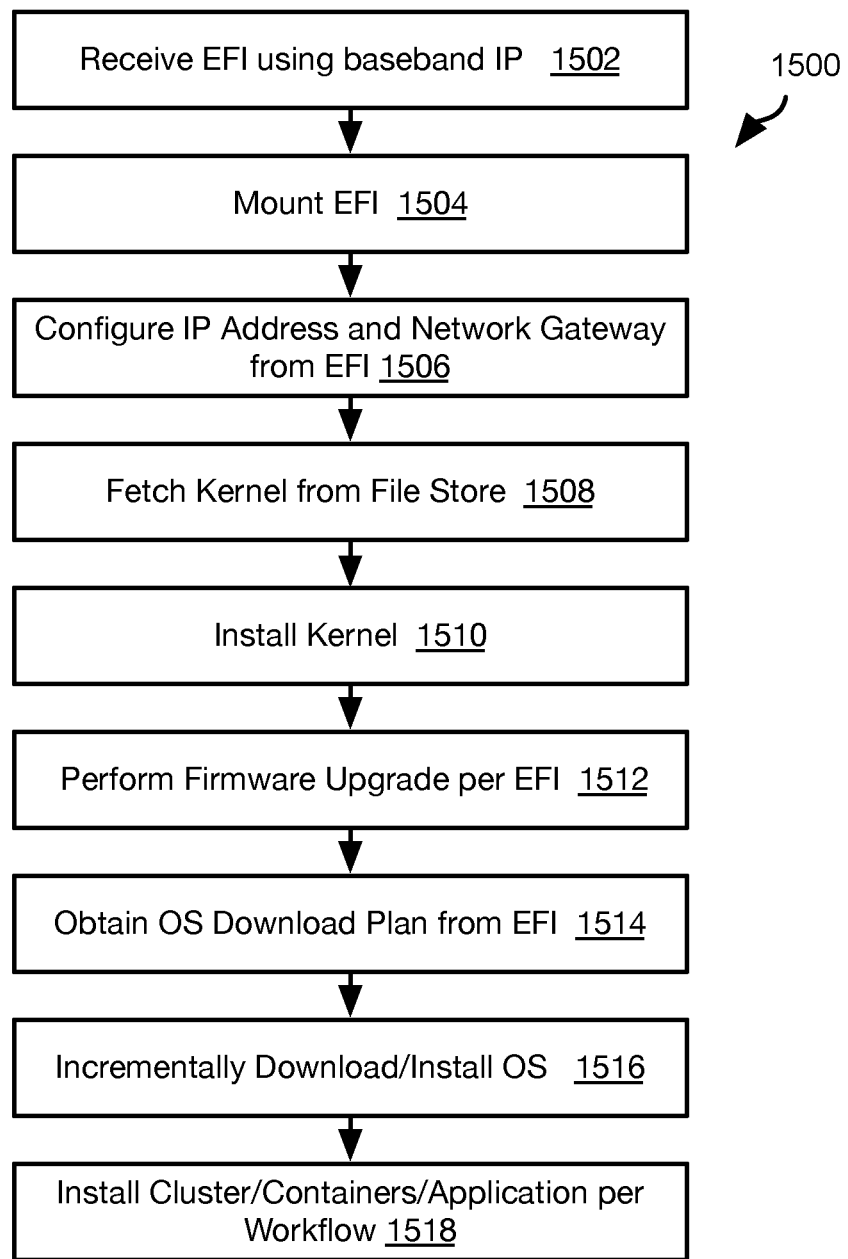
FIG. 15 is a process flow diagram of a method including actions performed on a server during initialization in accordance with an embodiment of the present invention.

FIG. 15 illustrates a method 1500 that may be executed by the server system 1302. The server system 1302 receives 1502 the ISO file including the EFI image, such as using the BMC IP address of the server system 1302 over a network to which the server system 1302 has been connected by an operator. The server system 1302 mounts 1504 the ISO image including the EFI, such as as a RAM disk. Many vendors, such as DELL, QUANTA, and SUPERMICRO provide an interface for mounting of a bootable ISO file, including ISO files received over a network assuming that firewall considerations for opening a port (e.g., 443) are already taken care of. Mounting of the ISO file may be performed manually or automatically. In the manual approach, a user may access an option to mount an ISO file in a BMC GUI, which, when selected, transports the contents of the ISO file into the buffers of the BMC. In t automated approach, the ISO ile is transferred directly to the BMC according to an interface provided by the vendor without the need to access a BMC.

The server system 1302 executes the bootloader included in the ISO image, such as an IPXE bootloader. The bootloader processes the instructions in the EFI, which causes the server system 1302 to configure 1506 itself to communicate using the server IP address specified for the server system 1302 in the EFI image and to connect to the network gateway specified in the EFI image. In particular, the EFI image may include instructions to configure a network interface of the server system 1302 to communicate with the server IP address and to connect to the network gateway.

As is apparent, this approach enables the server system 1302 to be configured to communicate with an IP address without the need for a dynamic host configuration protocol (DHCP) server. This eliminates the need to have dedicated DHCP servers for each sub-network of a network environment. For example, in many telecommunication applications, servers are grouped into racks with top of rack (TOR) switches at the north and south of the rack, which form a L2 (level 2) network. Connectivity from edge data center servers to regional data center servers flow through the TOR switches at the north and to the radio heads as the south. Provisioning of the servers of a rack according to DHCP requires a dedicated DHCP server on each rack (e.g., one of three to five servers) to lease IP addresses and facilitate OS installation. In a large data center with 10,000 racks, this means there must be 10,000 DHCP servers. Each DHCP server must itself be provisioned with a dedicated operating system image (e.g., a LINUX ISO file) that is quite large (~2 GB), which requires a large amount of storage space. The above described approach using the EFI image therefore eliminates the need for dedicated DHCP servers on each rack and for provisioning DHCP server operating system images for each rack.

Executing the EFI image by the bootloader further causes the server system 1302 to fetch 1508 an operating system kernel from the file store 522, which may include the use of the smart routing approach of FIG. 12. The operating system kernel may be in compressed files and may be fetched in a single download or multiple downloads. The operating system kernel, and possibly other configuration files, may be retrieved using HTTP, HTTPS, FTP (file transfer protocol), TFTP (trivial file transfer protocol). Fetching the operating system kernel at step 1508 may include pulling the kernel, images, packages, or other components. Retrieval of the operating system kernel and other files by means of HTTP may be performed due to the configuration of the network interface of the server 1302 to communicate using the server IP address and network gateway according to instructions in the EFI image.

Step 1508 may also include obtaining a client certificate, client key, CA (certificate authority) certificate or other data structures for performing authenticated communication from a network. These data structures may be retrieved from the artifacts 1306.

Executing of the EFI image included in the ISO file may require that the boot order of the system 1302 be changed. This may be the case where the target host is getting booted in the legacy BIOS. In some systems, booting the ISO file as a CD (compact disc) device causes the kernel to boot into legacy BIOS. For EFI booting, booting from a CD may be problematic, since a CD device is inherently not EFI capable in some systems. This causes the kernel not to detect the EFI BIOS and the kernel boots in legacy BIOS mode. To overcome this, the ISO may be mounted as a USB (universal serial bus) device that is capable of booting the hardware of the server 1302 in EFI mode. The boot order may therefore be changed such that the USB device boots earlier than the CD or the HDD.

The EFI image or the fetched files may include executable code enabling the server system 1302 to decompress and install 1510 the kernel from the fetched files. For example, step 1510 may include installing VMLINUZ or other kernel. Step 1510 may also include setting up a RAM disk on the server system 1302, such as using the "initrd" executable.

The method 1500 may further include performing 1512 firmware upgrades, such as upgrades to the firmware of any of the components described herein and performing other configurations or initializations of the components described herein. For example, the EFI image may include executable code instructing the server system 1302 to perform the upgrades. Alternatively, the EFI image may include executable code instructing the server system 1302 to download firmware upgrades from the file store 522. In yet another alternative, the files fetched for installing the operating system kernel may include firmware upgrade files that may be executed by the server system 1302 to upgrade the firmware of one or more components. In some embodiments, step 1512 may be performed prior to step 1510.

The method 1500 may include the server system 1302 obtaining 1514 an operating system download plan from the EFI. For example, once the operating system kernel is installed, the remainder of the operating system (Stage 2) may be downloaded using the same network interface used to install the operating system kernel. The download plan may include an ordered listing of files, such as installation packages, that when executed in sequence will result in installation of the operating system. The server system 1302 then downloads 1516 the files incrementally, e.g., sequentially and/or one at a time, until all are downloaded and executed, resulting in an installed and executing operating system on the server system 1302. Downloading of the operating system at step 1514 may include using the smart routing approach of FIG. 12.

Downloading and installing the operating system may further include performing tasks such as redundant array of independent disks (RAID) configuration, partitioning one or more non-volatile storage devices of the server system 1302, setting up a software repository ("repo"), performing service configurations, performing network configurations, and performing a final reboot of the server 1302.

As used with respect to step 1516, operating system, as opposed to an operating system kernel, shall be understood to include operating system components in addition to the kernel and possibly a different kernel. The operating system components in addition to the kernel may include a graphical user interface, libraries for use by applications executing on the server system 1302, user account management, and other high-level functions. In contrast, the operating system kernel may implement such functions as memory management, device drivers, a file system, and other low-level functions of the operating system.

The method 1500 may include one or more other steps 1518, such as resulting from executing functions 404 of a workflow 402. For example, a workflow 402 may include executing functions to configure the server system 1302 as part of a cluster (primary or secondary node), instantiate one or more containers and/or a virtual machine on the server 1302, instantiate an application on the server 1302, or other actions performed with respect to any of these items that may be instantiated.

Referring to FIGS. 16 through 19, the illustrated system 1600 may be used to manage pools of workers 516. The process of creating and deleting a worker can take several seconds, even under lightly loaded conditions. Accordingly, prior approaches for creating workers for processing an item of work followed by deletion are inefficient and introduce delays. The approach of FIGS. 16 through 19 may be used to implement items of work using workers more efficiently. An item of work may be a task, job, application execution with respect to data, or any processing that is performed as part of a computational activity. As described herein, items of work are function calls defined by a workflow 402 as part of implementing the workflow 402 according to the methods disclosed herein. However, any item of work may be processed using a pool of workers managed according to the approach described herein.

Workers 516 as described herein may be a pod, such as a KUBERNETES pod. Workers 516 may also include containers, which may be managed by a pod. There are various types of containers that may have various configurations. For example, DOCKER, JETTY, TOMCAT, WILDFY, SPRINGBOOT, UNIKERNELS, LXD, OPENVZ, RKT, WINDOWS SERVER CONTAINERS, HYPER-V CONTAINERS, or the like. Configurations of a container may include the programming language (PYTHON, RUBY) it supports, the operating system it emulates (WINDOWS, LINUX, CENTOS, UBUNTU, REDHAT), tools available in the container (e.g., ANSIBLE), and whether it is designed for a particular type of application, e.g., computation vs. data access. Accordingly, the workers 516 may be non-homogenous in that the type and configurations of the workers 516 may be different and each worker 516 may not be suitable for each item of work.

Figure 16:
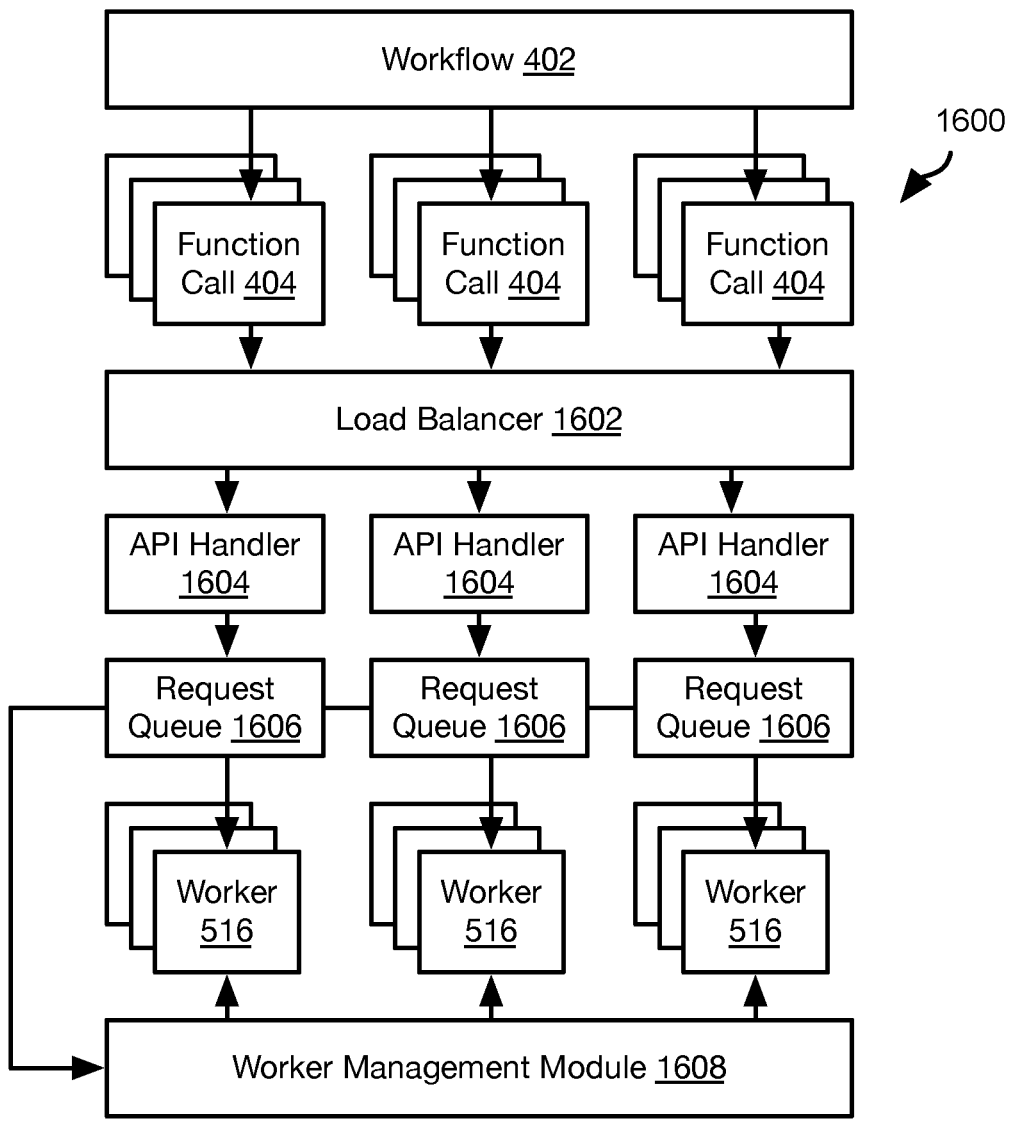
FIG. 16 is a schematic block diagram of a system for implementing a worker pool in accordance with an embodiment of the present invention.

Referring specifically to FIG. 16, processing of a workflow 402 may invoke various function calls 404, such as calls to functions of elements 300. In other instances, function calls 404 are part of a batch of functions or some other computing activity rather than a workflow. These function calls 404 may include calls to any of the functions 302-312 of an element 300 described herein. The function calls 404 may be input to a load balancer 1602 that distributes the function calls to one or more API handlers 1604. The load balancer 1602 may implement any load balancing approach known in the art, such as round robin, in order to implement priority or fairness criteria.

Each API handler 1604 then adds the function calls 404 it receives to a request queue 1606. The API handler 1604 may add the function calls 404 to the queue 1606 in order to enforce a rate limit, role-based access control (RBAC), quotas, or other policies. For example, function calls 404 may have properties such as an associated element, user, workflow, or other entity. The properties may include a type or other value relating to processing by the API handler. Accordingly, the API handler 1604 may add function calls 404 to the request queue 1606 according to policies applied to the properties of the function calls 404 received by the API handler 1604. For example, function calls 404 from a particular user may be subject to a rate limit (e.g., number of function calls per minute) such that function calls 404 will be throttled and added to the queue 1606 at a rate no faster than that rate limit.

One or more workers 516 may be associated with each request queue 1606 and select items from the queue 1606 for processing. Function calls 404 in a queue 1606 may be selected and removed from the queue on a first-in-first out (FIFO) basis. Function calls may have a priority associated therewith. Accordingly, function calls may be selected and removed based on priority and FIFO, i.e., among function calls with the same priority the oldest unexecuted call will be selected when function calls with that priority are being executed. Whether a particular priority is selected for selection of a function call may be determined randomly with the probability of a priority being selected increasing with the value of the priority (e.g., higher priority=more likely to be selected).

Removing function calls 404 from the queue 1606 may be performed by pushing function calls 404 to workers or the workers pulling function calls 404 from the queue 1606, or a combination of pushing and pulling.

The creation and deletion of the workers 516 may be managed by a worker management module 1608. The worker management module 1608 may be part of the deployment automation module 116 or may be a separate application and process. The worker management module 1608 may execute on a computing node of a network environment, such as the network environment 100. The worker management module 1608 may manage the creation and deletion of workers 516 on multiple nodes of a network environment, including nodes connected by a network to the node on which the worker management module 1608 is executing. The multiple nodes may be part of multiple clusters, such as KUBERNETES clusters, defined in the network environment. In other implementations, the worker management module 1608 only manages workers 516 on the node executing the worker management module 1608.

Figure 17:
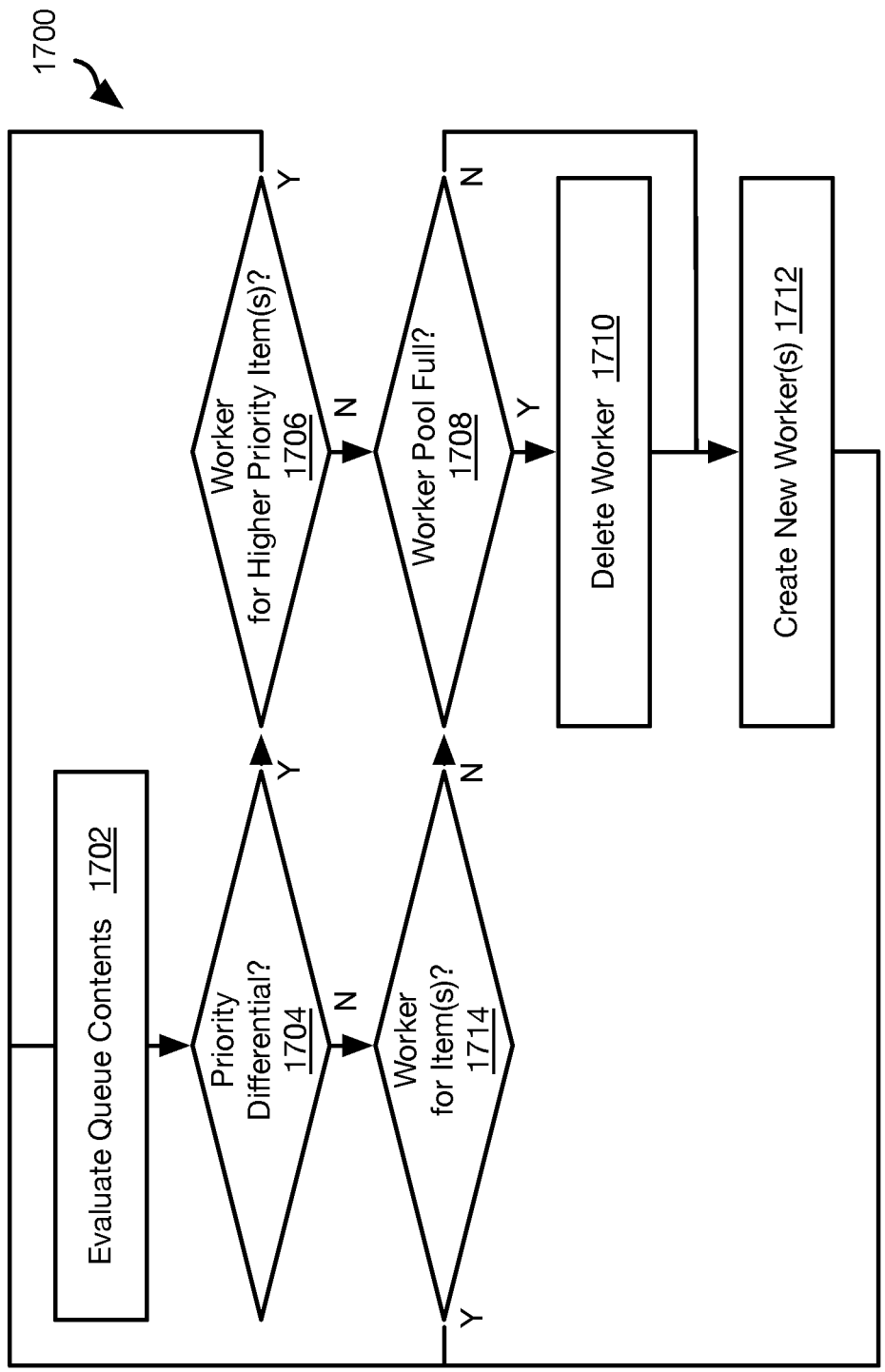
FIG. 17 is a process flow diagram of a method for managing a worker pool in accordance with an embodiment of the present invention.

FIG. 17 illustrates a method 1700 that may be executed by the worker management module 1608 with respect to a worker pool. The worker pool may be defined as workers 516 on one or more nodes managed by the worker management module 1608 and available capacity to implement workers 516 on the one or more nodes. A worker pool may be include a limit indicating a maximum number of workers that may be implemented by the one or more nodes or an individual node of the one or more nodes. Nodes may be arranged in clusters such that a maximum number of workers 516 per cluster may be defined. Limits may also be defined in terms of resources of a node or cluster: memory and/or processing cores available to be allocated to workers 516.

The method 1700 may include evaluating 1702 the contents of the queue 1606 of the worker management module 1608. As noted above, workers 516 may be non-homogeneous and function calls 404 may be constrained to execute on workers of a given type. Accordingly, evaluating 1702 may include evaluating the worker types required by the function calls 404 in the queue 1606, e.g. N calls require a worker of type A, M calls require a worker of type B, etc., where N and M are integers and A and B are labels of different worker types.

The method 1700 may include evaluating 1704 whether there is a priority differential for the function calls 404 in the queue 1606, i.e. whether any of the function calls 404 have a priority higher than other function calls 404 in the queue 1606. If so, the method 1700 may include evaluating 1706 whether one or more workers 516 in the worker pool are of the appropriate type to execute the higher priority function calls. Step 1706 may include evaluating whether a sufficient number of workers 516 of the appropriate type are available, e.g. as many workers of the appropriate type as there are higher priority function calls that require the appropriate type up to some limit such as the maximum number of workers 516 permitted by the worker pool or a maximum percentage of the maximum number of permitted workers 516.

If there are no workers of the appropriate type for the higher priority function calls or if the number of workers of the appropriate type is insufficient, the method 1700 may include evaluating 1708 whether the worker pool is full. If so, then one or more workers that are not of the appropriate type are deleted 1710 and one or more new workers of the appropriate type are created 1712. The number deleted 1710 and created 1712 may be such that the number of workers 516 of the appropriate type is sufficient as described above (equal to number of the higher priority function calls requiring the appropriate type up to the limit as defined above).

In some embodiments, there may be proximity constraints or other artificially defined constraints that require that a particular function call be executed on a particular node or cluster of nodes or a node having particular hardware attributes. Accordingly, steps 1706, 1708, and 1712 may be performed with respect to the workers 516 or capacity to implement workers 516 of that particular node or cluster of nodes.

If the result of step 1706 is positive, then no adjustments to the workers 516 of the worker pool are performed. If the worker pool is not found 1708 to be full, then deletion 1710 may be omitted.

If there is no priority differential 1704, the method 1700 may include evaluating 1714 whether one or more workers are available for the function calls of the queue. For example, suppose there are function calls 404 requiring workers of type A and function calls 404 requiring function calls of type B. In this case, step 1714 may include evaluating whether workers 516 of either of type A or type B are present. Accordingly, step 1714 would have a positive result if there were only workers 516 of type A, only workers of type B, or a mix of workers 516 of types A and B. This can be implemented with any number of workers types. As for step 1706, step 1704 may include evaluating whether a sufficient number of workers 516 are available, for example if the total number of function calls 404 in the queue 1606 is N and the total number of workers 516 is less than N and less than the maximum number of permitted workers, the result of step 1714 may be negative.

If the result of step 1714 is positive, then processing of function calls 404 from the queue 1606 may be performed using the current makeup of the worker pool without taking further action. If the result of step 1714 is negative, then processing may continue at step 1708 as described above. If the worker pool is found to be full, then one or more workers 516 that are not of the type to execute one or more function calls in the queue 1606 are deleted 1710 and one or more workers that are of the appropriate type to execute one or more function calls in the queue 1606 are created 1712. Where there are function calls 404 requiring multiple types of workers, creating 1712 new workers may include creating workers of those multiple types, such as according to the number of functions calls 404 requiring each type (more function calls requiring a type=more workers of that type). If the worker pool is not found 1708 to be full, then deletion 1710 may be omitted.

Various modifications of the method 1700 are possible. For example, the number of workers 516 deleted or created at steps 1710, 1712 may be selected according to an algorithm that takes into account the amount of time required to create and delete containers and the number of function calls 404 requiring each type of workers 516. The algorithm may therefore seek to determine a number to create and delete and when to do so in order to reduce the total time require to execute the function calls 404 in the queue 1606.

In addition, the method 1700 may include deleting workers 516 based on lack of demand. For example, if a worker 516 is not deleted in order to provide room for another worker but is nonetheless not being used, the worker 516 may be deleted based on some criteria, e.g. an expiration period passing without a function call 404 requiring the worker 516 being added to the queue 1606.

Figure 18:
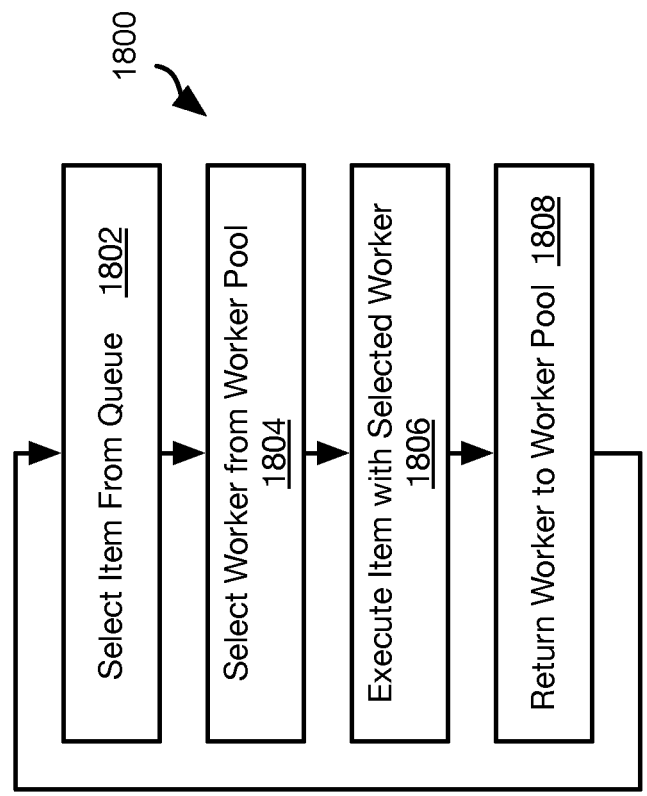
FIG. 18 is a process flow diagram of a method for processing items using a worker pool in accordance with an embodiment of the present invention.

FIG. 18 illustrates a method 1800 for processing function calls 404. The method 1800 may be executed by a worker 516, an module executing on a node executing a worker 516, or by a module implementing the queue 1606. The method 1800 may include selecting 1802 an item, e.g., function call 404, from the queue 1606. As noted above, this may include selection based on FIFO, priority, or a combination of these.

The method 1800 may include selecting 1804 a worker 516 from the worker pool for the queue 1606. This may include selecting a worker 516 of the appropriate type to execute the selected function call 404. Where a function call 404 has a constraint as to where it is executed, the selected worker 516 is selected from a computing node meeting this constraint. This may further include implementing a load balancing algorithm. In particular, where workers 516 of the appropriate type are executing on multiple computing nodes, the selected worker 516 may be selected in order to balance loading of the multiple computing nodes.

The function call is then executed 1806 by the selected worker 516. This may include the worker 516 loading executable code for the function and/or other data to be operated on according to the function call. The executable code may be obtained from a file store 522, such as using the smart routing approach of FIG. 12.

Once a worker has been selected 1804, it may be flagged as unavailable by the module performing the method 1800 such that it will not be selected again. Upon completion of the function call, the selected worker 516 may be returned 1808 to the worker pool, such as by clearing the flag thereby indicating that the worker 516 is available to be selected.

In some instances, a worker 516 may fail to complete execution a function call 404. In such instances, the function call 404 may be returned to the queue 1606 and it will be attempted to executed it again. The worker 516 is also returned to the worker pool and is available for selection again.

Figure 19:
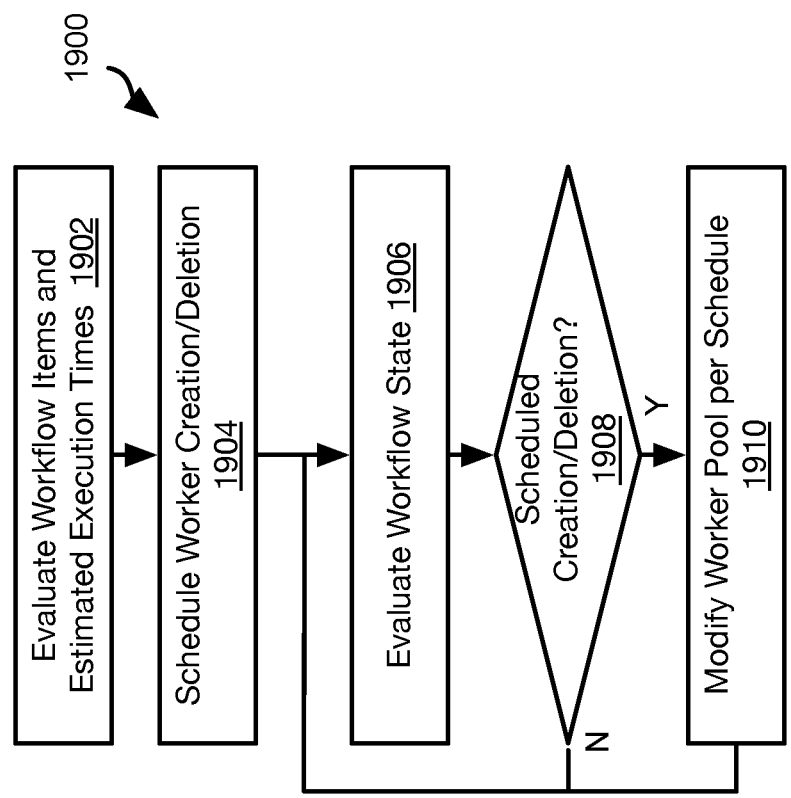
FIG. 19 is a process flow diagram of a method for scheduling worker pool management in accordance with an embodiment of the present invention.

FIG. 19 illustrates a method 1900 for scheduling the creation and deletion of workers. The method 1800 may be executed by a worker 516, an module executing on a node executing a worker 516, or by a module implementing the queue 1606. The module executing the method 1900 may be the same as or different from that implementing the method 1800. The method 1900 may be executed in place of or in combination with the method 1800. For example, workers 516 may be created and deleted during execution of a workflow 402 as scheduled according to the method 1900. The workers 516 in a worker pool may also be adjusted according to contents of the queue 1606 according to the method 1800 during execution of the same workflow 402.

The method 1900 may include evaluating 1902 items of work, e.g. function calls 404, of a workflow. Each function call may have a predefined execution time that is an estimate of how long the function call requires to execute. The execution time may be obtained by measuring actual times of execution or by some other means. Step 1902 may further include evaluating exclusivity of each function call 404. Some function calls 404 may be required to be the only function call 404 of the workflow 402 executing at its time of executing the function call 404. Such function calls 404 may be flagged as exclusive in the function definition of the element 300 that defines that function call. In other cases, a function call 404 may be executed in parallel with other function calls of a workflow 402 and therefore such a function call is not flagged as exclusive. The workflow 402 may further define ordering constraints, i.e. that one function call 404 must complete before another function call 404 may execute.

The method 1900 may include scheduling 1904 worker creation and deletion for the function calls 404 according to their exclusivity, ordering constraints, and execution times. For example, if the workflow 402 is estimated to begin executing first function calls that are non-exclusive at T0 and with execution times <=D1, then a subsequent exclusive function call may be scheduled to execute at T1=T0+D1-E, where E is an adjustment factor that takes into account the amount of time required to create the worker 516. In another example, if the workflow is estimated to begin executing an exclusive function call with execution time of D1 at T0, one or more subsequent function calls 404 according to an ordering constraint may be scheduled to execute at T1=T0+D1-E. In another example, if a first function call 404 is followed by another function call 404 due to an exclusivity or ordering constraint and requires the same type of worker 516, no creation of an additional worker 516 is performed. If, following the estimated time of completion time of a function call 404 a worker 516 of the type used by that function call 404 is not required by a subsequent function call 404 according to an ordering or exclusivity constraint, the worker 516 may be scheduled to be deleted after the time of completion.

The scheduled creation time of workers 516 for any number of function calls 404 of a workflow 402 may be scheduled according to the examples described above. The schedule may be in terms of relative times, e.g. a time of creation or deletion is a fixed offset relative to when execution of a workflow 402 is started. The schedule may also be in terms of actual times of completion: the scheduled start time of a function call 404 is defined with respect to time of starting execution or a time of completion of execution of another function call 404. For example, if function calls A, B, and C are required to perform in the listed order, the scheduled creation time of a worker for function call C may be scheduled as a time offset relative to the actual start time of execution of function call B in order to account for delays in completion of execution of function call A.

Following commencement of execution of the workflow 402, the method 1900 may include evaluating 1906 state of execution of the workflow 402. If creation or deletion of a worker 516 is called for according to the schedule from step 1904 and the state of execution of the workflow 402, then the workflow pool is modified 1910 accordingly, i.e. a worker 516 is deleted or created as defined in the schedule. For example, continuing the example above, this may include determining evaluating whether a function call A has completed and, if so, creating a worker for function call C at a time offset relative to starting of execution of function call B. Any number of function calls 404 with any number of relative times of creation of workers 516 may be implemented according to the schedule at step 1908. In some embodiments, a state of execution of a function call may be evaluated, e.g. a percentage complete. A scheduled creation of a worker for another function call may therefore be defined in terms of percentage of completion, e.g., create worker for function call B when function call A is 95 percent complete. This scheduled creation may then be performed when the completion state of function call A reaches the required completion.

Figure 20:
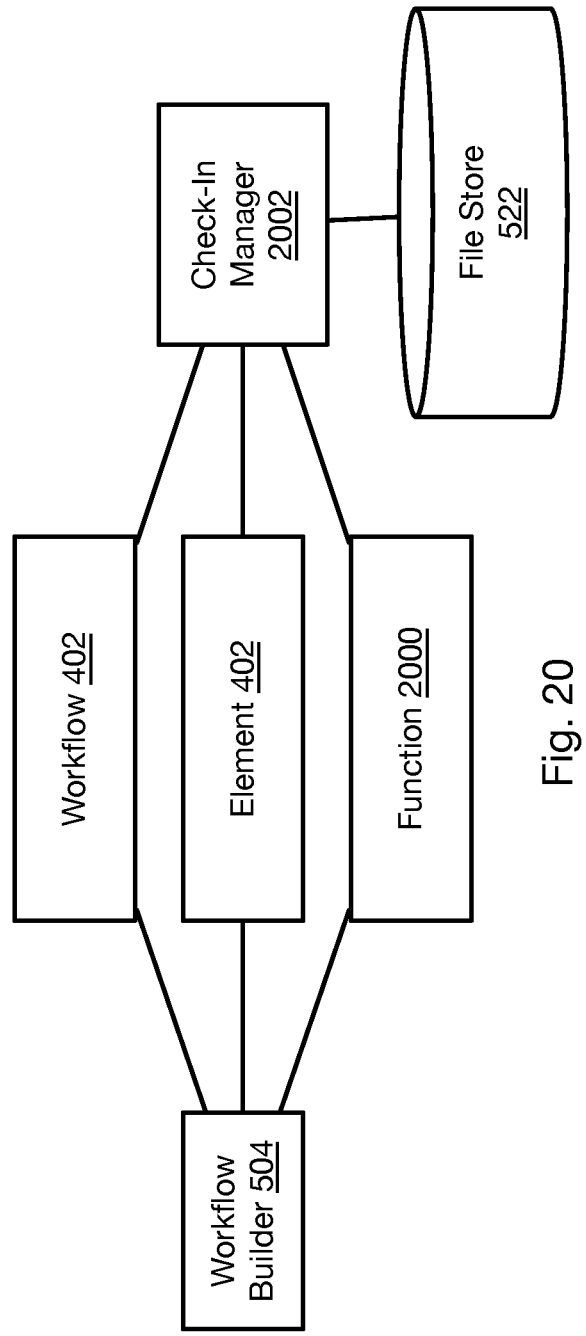
FIG. 20 is a schematic block diagram of components for monitoring check ins with respect to a workflow in accordance with an embodiment of the present invention.

Referring to FIG. 20, as noted above, a file store 522 may store functions 2000 defined for elements 300, these functions 2000 may include any of the functions 302-312 of an element 300 as described above. A user may create elements 300 and functions 2000 of elements, such as using the workflow builder 504, playground 514, text editor, integrated design environment (IDE), or other software development tool. The user may then store the elements 300 and functions 404 in the file store 522.

The file store 522 may be managed by a check-in manager 2002 executing on a node of the network environment 100, such as the node implementing the file store 522. The check-in manager 2002 may monitor files stored in the file store 522 and the relationship between files. For example, these relationships may include whether a file is a function 2000 of a particular element, which function files are referenced by a file defining an element 300, and which function files and element files are referenced by a file defining a workflow 402.

The check-in manager 2002 may further manage checking in and checking out of files. A file may be checked out to a user and be locked from revision by other users until checked back in by the user. The check-in manager 2002 may operate in conjunction with a code repository management tool known in the art such as GITHUB. For example, the repository tool may manage checking in and checking out of files and managing version history and other functions of such a tool. The check-in manager 2002 may then implement functions with respect to workflows as described herein.

Figure 21:
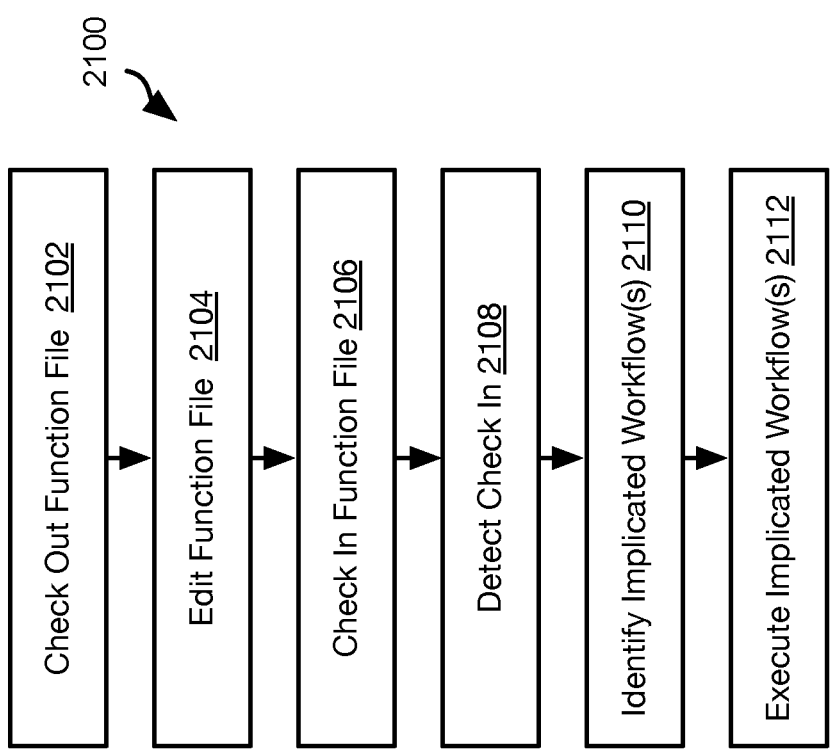
FIG. 21 is a process flow diagram of a method for monitoring check ins with respect to a workflow in accordance with an embodiment of the present invention.

Referring to FIG. 21, the check-in manager 2002 may execute the illustrated method for files checked out and checked in by the check-in manager 2002. The method 2100 may include checking out 2102 a function file to a user. This may include retrieving the function file, flagging the function file as checked out in a registry of function files, and returning the function file to a requestor that requested checkout of the function file. The user may then edit 2104 the function file using any of the software development tools described above and then checks in 2106 the edited function file.

As noted above, checking out and checking in of the function file may be performed by the check-in manager 2002 or by a code repository tool. Where a code repository tool is used, the method 2100 may include detecting 2108 the check in. This may include detecting change to the function file independent of the code repository tool, such as by comparing a hash of the function file to a previously-generated hash of the function file, detecting writing to the file by an operating system, receiving a report of the check in from the code repository tool or a log file of the code repository tool.

The method 2100 may include identifying 2110 an implicated workflow 402. As noted above, the check-in manager 2002 may record relationships between files. Accordingly, all workflows 402 that reference an element 300 for which the edited function file defines a function 2000 may be determined to be implicated workflows 402.

Each of these implicated workflows 402 may then be executed 2112. Executing the workflow may include executing the workflow 402 according to the systems and methods described above. This may include recreating the application pipeline created by the implicated workflow. Executing 2112 a workflow 402 may further include shutting down an application pipeline previously instantiated by the workflow 402 and/or handing off operation of the previous instance of the application pipeline to the new instance of the application pipeline created at step 2112.

In some embodiments, executing 2112 the workflow 402 may include executing 2112 the workflow 402 in a test environment (e.g., virtual machine or set of virtual machines in a simulated network).

Figure 22:
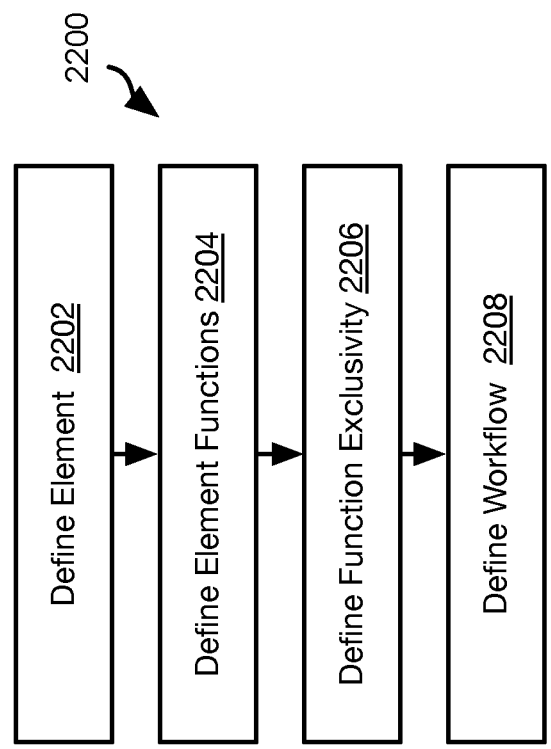
FIG. 22 is a process flow diagram of a method for defining a workflow with exclusivity of functions being defined in accordance with an embodiment of the present invention.

FIG. 22 illustrates a method 2200 for defining exclusivity of elements 300 and functions 2000 of elements 300. The method 2200 may include defining 2202 an element 300 and defining 2204 functions of the element 300. This may include defining data structures for any of the elements 300 and the functions 2000 of an element 300 as described above. The method 2200 may further include defining 2206 exclusivity of the functions 2000. Exclusivity is a property of a function 2000 of a workflow that indicates whether the function 2000 may execute concurrently with another function 2000 of that workflow 402, and possibly another function 2000 of another workflow. Exclusivity of a function 2000 may be defined as element-wide meaning that no other function 2000 of the same element may execute while the function 2000 is executing. Exclusivity of a function 2000 may be defined as workflow-wide meaning that no other function 2000 of the same workflow may execute while the function 2000 is executing. Exclusivity of a function 2000 may be defined as device-wide meaning that no other function 2000 of the same workflow 402 may execute on a device executing the function 2000 while the function 2000 is executing. Exclusivity of a function 2000 may be defined as global meaning that no other function 2000 of any workflow 402 may execute on a device executing the function 2000 while the function 2000 is executing.

The method 2200 may further include defining 2208 one or more workflows 402 using the elements 300 and functions 2000 as described above. The function calls 404 of the workflows 402 may inherent the exclusivity of the functions 2000 they reference. Accordingly, the workflow 402 may be implemented in such a way that enforces the exclusivity of the functions 2000.

Figure 23:
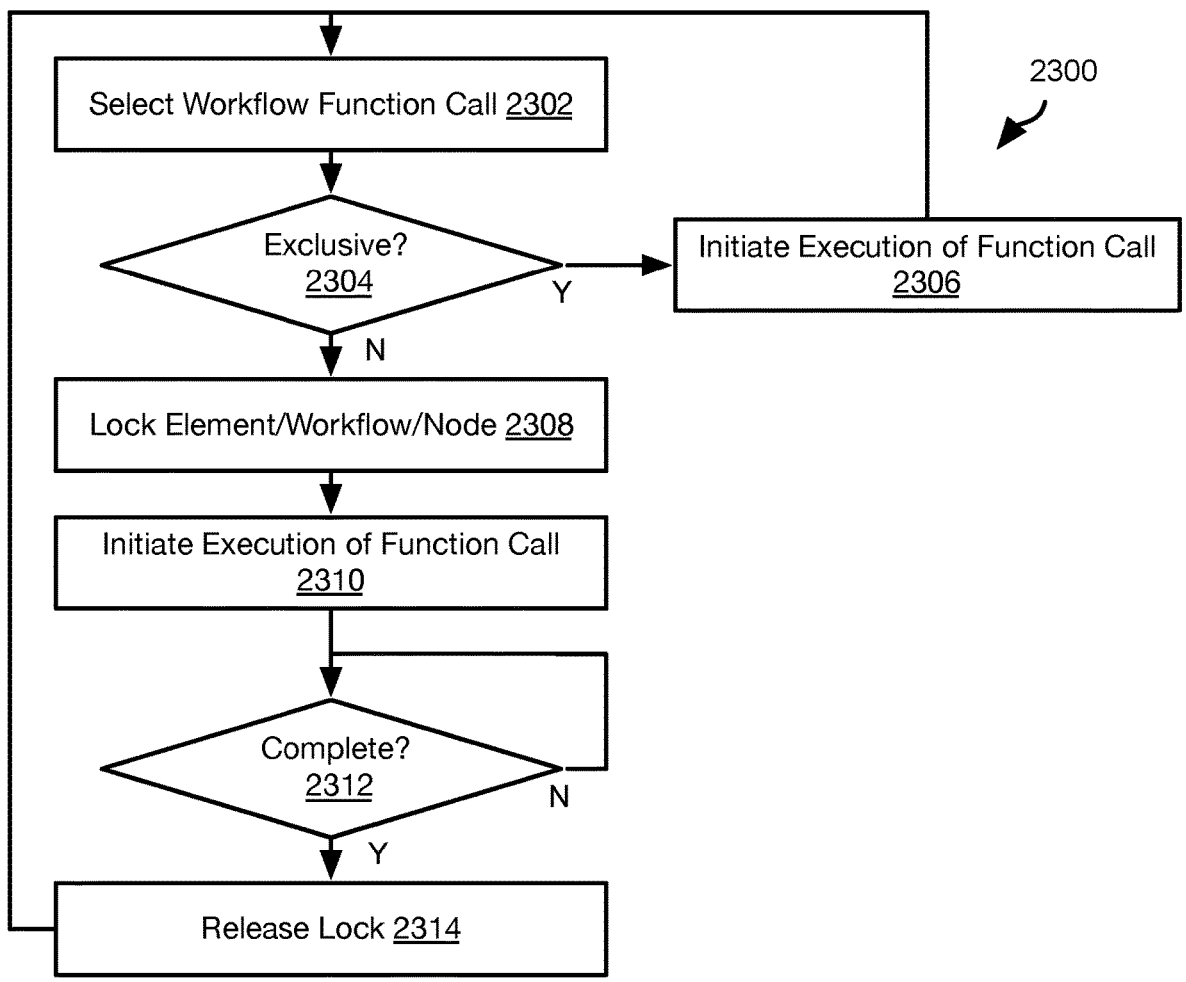
FIG. 23 is a process flow diagram of a method for executing a workflow with reference to the exclusivity of functions in accordance with an embodiment of the present invention.

FIG. 23 illustrates a method 2300 for implementing the function calls 404 of a workflow 402 while taking into account exclusivity. The method 2300 may be executed by the workflow orchestrator 506 when executing a workflow 402 or by some other module. The method 2300 may include processing the function calls 404 of the workflow 402, such as in an order specified in the workflow 402. The method 2300 may include selecting 2302 a function call 404 ("subject call") from the workflow 402 and evaluating 2304 the exclusivity of the function 2000 referenced by the function call 404 ("subject function").

If the subject function is not found 2304 to be exclusive, execution of the subject call is initiated 2306 and another function call 2302 is selected for processing. In some embodiments, multiple non-exclusive function calls 404 may be processed according to steps 2302, 2304, 2306 in parallel or as a batch.

If the subject function is found 2304 to be exclusive, then a lock may be implemented 2308 for an entity as defined in the exclusivity of the subject function. The entity may include any of an element 300, workflow 402, computing node, or globally for a network environment 100 as specified in the exclusivity of the subject function. Implementing the lock may instruct the workflow orchestrator 506 not to execute any other function calls 404 for the entity locked according to the exclusivity: no functions calls 404 of a locked workflow, no functions 404 on a locked node, no functions calls 404 operating on a locked element, or no function calls 404 globally in a network environment managed by the workflow orchestrator 506.

Execution of the subject call may be initiated 2310, such as by invoking execution of the subject call by a worker 516 of a worker pool as described above. When the subject call is found 2312 to have been completed, the lock may be released 2314 by the workflow orchestrator 506 and another function call of the workflow may be selected 2302 for processing according to the method 2300.

Figure 24:
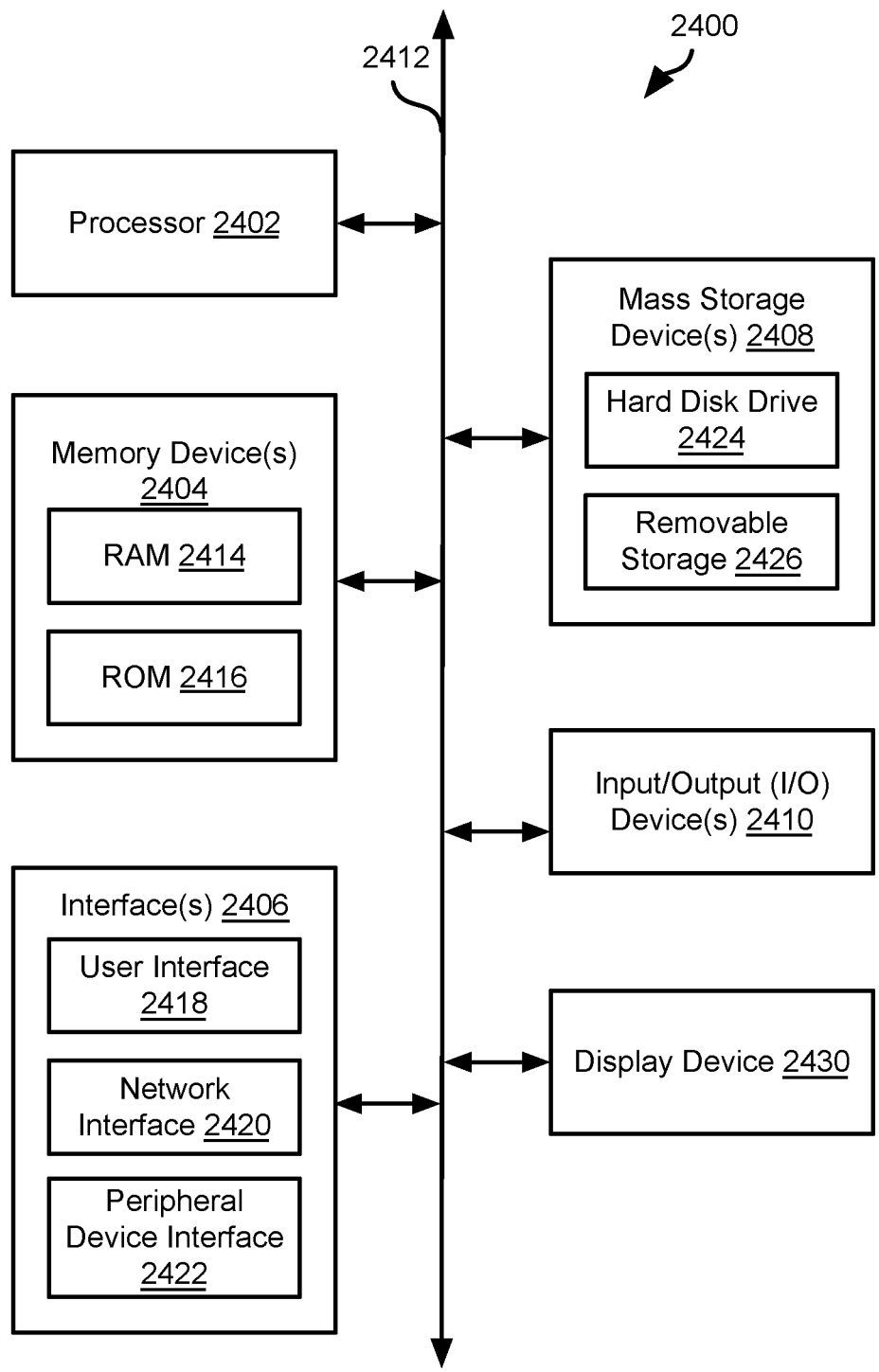
FIG. 24 is a schematic block diagram of an example computing device suitable for implementing a methods in accordance with embodiments of the invention.

FIG. 24 is a block diagram illustrating an example computing device 2400. Computing device 2400 may be used to perform various procedures, such as those discussed herein. Computing device 2400 includes one or more processor(s) 2402, one or more memory device(s) 2404, one or more interface(s) 2406, one or more mass storage device(s) 2408, one or more Input/output (I/O) device(s) 2410, and a display device 2430 all of which are coupled to a bus 2412. Processor(s) 2402 include one or more processors or controllers that execute instructions stored in memory device(s) 2404 and/or mass storage device(s) 2408. Processor(s) 2402 may also include various types of computer-readable media, such as cache memory.

Memory device(s) 2404 include various computer-readable media, such as volatile memory (e.g., random access memory (RAM) 2414) and/or nonvolatile memory (e.g., read-only memory (ROM) 2416). Memory device(s) 2404 may also include rewritable ROM, such as Flash memory.

Mass storage device(s) 2408 include various computer readable media, such as magnetic tapes, magnetic disks, optical disks, solid-state memory (e.g., Flash memory), and so forth. As shown in FIG. 24, a particular mass storage device is a hard disk drive 2424. Various drives may also be included in mass storage device(s) 2408 to enable reading from and/or writing to the various computer readable media. Mass storage device(s) 2408 include removable media 2426 and/or non-removable media.

I/O device(s) 2410 include various devices that allow data and/or other information to be input to or retrieved from computing device 2400. Example I/O device(s) 2410 include cursor control devices, keyboards, keypads, microphones, monitors or other display devices, speakers, printers, network interface cards, modems, lenses, CCDs or other image capture devices, and the like.

Display device 2430 includes any type of device capable of displaying information to one or more users of computing device 2400. Examples of display device 2430 include a monitor, display terminal, video projection device, and the like.

Interface(s) 2406 include various interfaces that allow computing device 2400 to interact with other systems, devices, or computing environments. Example interface(s) 2406 include any number of different network interfaces 2420, such as interfaces to local area networks (LANs), wide area networks (WANs), wireless networks, and the Internet. Other interface(s) include user interface 2418 and peripheral device interface 2422. The interface(s) 2406 may also include one or more peripheral interfaces such as interfaces for printers, pointing devices (mice, track pad, etc.), keyboards, and the like.

Bus 2412 allows processor(s) 2402, memory device(s) 2404, interface(s) 2406, mass storage device(s) 2408, I/O device(s) 2410, and display device 2430 to communicate with one another, as well as other devices or components coupled to bus 2412. Bus 2412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 2400, and are executed by processor(s) 2402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
   receiving, by a computer system, a workflow defining a plurality of function calls, each call of the plurality of function calls being a call to a function of an element of a plurality of elements instantiated according to the workflow;
   storing, by the computer system, the workflow and the functions of the plurality of elements in a file store;
   executing, by the computer system, the workflow in a network environment;
   detecting, by the computer system, checking in of a file to the file store;
   determining, by the computer system, that (a) the file defines a function referenced by a function call of the plurality of function calls; and
   in response to determining (a), again executing, by the computer system, the workflow in the network environment.

2. The method of claim 1, wherein the plurality of function calls instantiate a network application pipeline in the network environment.

3. The method of claim 1, wherein detecting checking in of the file to the file store comprises detecting checking in to a code repository management tool.

4. The method of claim 1, wherein executing the workflow in the network environment comprises retrieving executable code defining the functions called by the plurality of function calls from the file store.

5. The method of claim 1, wherein the functions of the plurality of elements include any of:
   life cycle management functions;
   inventory management functions;
   discovery facilitating functions;
   health check functions;
   healing functions; and
   policy implementation functions.

6. The method of claim 1, wherein the functions of the plurality of elements have an exclusivity associated therewith;
   wherein executing the workflow in the network environment comprises, for each function call of the plurality of function calls of the workflow:
   evaluating the exclusivity of a subject function of the plurality of elements referenced by the each function call; and
   when the exclusivity of the subject function requires exclusive execution, executing the each function call while preventing execution of one or more other function calls of the plurality of function calls of the workflow.

7. The method of claim 1, wherein the functions of the plurality of elements have an exclusivity associated therewith;
   wherein executing the workflow in the network environment comprises, for each function call of the plurality of function calls of the workflow:
   evaluating the exclusivity of a subject function of the plurality of elements referenced by the each function call; and
   when the exclusivity of the subject function requires workflow exclusive execution, executing the each function call while preventing execution of all other function calls of the plurality of function calls of the workflow.

8. The method of claim 7, further comprising, when the exclusivity of the subject function requires workflow does not require exclusive execution, executing the each function call concurrently with one or more other function calls of the plurality of function calls of the workflow.

9. A system comprising one or more processing devices and one or more memory devices coupled to the one or more processing devices, the one or more memory devices storing executable code that, when executed by the one or more processing devices, causes the one more processing devices to:
   receive, a workflow defining a plurality of function calls, each call of the plurality of function calls being a call to a function of an element of a plurality of elements instantiated according to the workflow;
   store the workflow and the functions of the plurality of elements in a file store;
   execute the workflow in a network environment;
   detect checking in of a file to the file store;
   determine that (a) the file defines a function referenced by a function call of the plurality of function calls; and
   in response to determining (a), again execute the workflow in the network environment.

10. The system of claim 9, wherein the executable code, when executed by the one or more processing devices, further causes the one or more processing devices to detect checking in of the file to the file store by detecting checking in to a code repository management tool.

11. The system of claim 9, wherein the executable code, when executed by the one or more processing devices, further causes the one or more processing devices to execute the workflow in the network environment by retrieving executable code defining the functions called by the plurality of function calls from the file store.

12. The system of claim 9, wherein the functions of the plurality of elements include any of:
life cycle management functions;
inventory management functions;
discovery facilitating functions;
health check functions;
healing functions; and
policy implementation functions.

13. The system of claim 9, wherein the functions of the plurality of elements have an exclusivity associated therewith;
wherein the executable code, when executed by the one or more processing devices, further causes the one or more processing devices to execute the workflow in the network environment by, for each function call of the plurality of function calls of the workflow:
evaluating the exclusivity of a subject function of the plurality of elements referenced by the each function call; and
when the exclusivity of the subject function requires exclusive execution, executing the each function call while preventing execution of one or more other function calls of the plurality of function calls of the workflow.

14. The system of claim 9, wherein the functions of the plurality of elements have an exclusivity associated therewith;
wherein the executable code, when executed by the one or more processing devices, further causes the one or more processing devices to execute the workflow in the network environment by, for each function call of the plurality of function calls of the workflow:
evaluating the exclusivity of a subject function of the plurality of elements referenced by the each function call; and
when the exclusivity of the subject function requires workflow exclusive execution, executing the each function call while preventing execution of all other function calls of the plurality of function calls of the workflow.

15. The system of claim 14, wherein the executable code, when executed by the one or more processing devices, further causes the one or more processing devices to, when the exclusivity of the subject function requires workflow does not require exclusive execution, execute the each function call concurrently with one or more other function calls of the plurality of function calls of the workflow.

16. A non-transitory computer-readable medium storing executable code that, when executed by one or more processing devices, causes the one more processing devices to:
receive, a workflow defining a plurality of function calls, each call of the plurality of function calls being a call to a function of an element of a plurality of elements instantiated according to the workflow;
store the workflow and the functions of the plurality of elements in a file store;
execute the workflow in a network environment;
detect checking in of a file to the file store;
determine that (a) the file defines a function referenced by a function call of the plurality of function calls; and
in response to determining (a), again execute the workflow in the network environment.

17. The non-transitory computer-readable medium of claim 16, wherein the plurality of function calls are configured to instantiate a network application pipeline in the network environment.

18. The non-transitory computer-readable medium of claim 16, wherein the executable code, when executed by the one or more processing devices, further causes the one or more processing devices to detect checking in of the file to the file store by detecting checking in to a code repository management tool.

19. The non-transitory computer-readable medium of claim 16, wherein the executable code, when executed by the one or more processing devices, further causes the one or more processing devices to execute the workflow in the network environment by retrieving executable code defining the functions called by the plurality of function calls from the file store.

20. The non-transitory computer-readable medium of claim 16, wherein the functions of the plurality of elements have an exclusivity associated therewith;
wherein the executable code, when executed by the one or more processing devices, further causes the one or more processing devices to execute the workflow in the network environment by, for each function call of the plurality of function calls of the workflow:
evaluating the exclusivity of a subject function of the plurality of elements referenced by the each function call;
when the exclusivity of the subject function requires workflow exclusive execution, executing the each function call while preventing execution of all other function calls of the plurality of function calls of the workflow; and
when the exclusivity of the subject function requires workflow does not require exclusive execution, execute the each function call concurrently with one or more other function calls of the plurality of function calls of the workflow.

\* \* \* \* \*